(12) United States Patent
Awata et al.

(10) Patent No.: US 6,762,715 B2
(45) Date of Patent: Jul. 13, 2004

(54) POSITIONING RECEIVER AND POSITIONING CALCULATION METHOD

(75) Inventors: Hideki Awata, Kanagawa (JP);
Masayuki Takada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/600,902

(22) Filed: Jun. 20, 2003

(65) Prior Publication Data

US 2004/0104840 A1 Jun. 3, 2004

(30) Foreign Application Priority Data

Jun. 24, 2002 (JP) ........................................ 2002-182380

(51) Int. Cl.[7] .............................. G01S 5/02; H04B 7/185
(52) U.S. Cl. ............................ 342/357.12; 342/357.06; 701/231
(58) Field of Search ...................... 342/357.12, 357.16; 701/213

(56) References Cited

U.S. PATENT DOCUMENTS 5,434,787 A * 7/1995 Okamoto et al. ........... 701/214

* cited by examiner

Primary Examiner—Theodore M. Blum
(74) Attorney, Agent, or Firm—Frommer Lawrence & Haug LLP; William S. Frommer

(57) ABSTRACT

The at least five simultaneous equations include at least five unknown quantities, namely, a reference time, an error of a clock for measuring a diffusion-code reception time for each of the satellites and the 3-dimensional coordinates of the receiver. The diffusion code is transmitted from each of the satellites at a diffusion-code transmission time expressed as a sum of a time having a value represented by digits expressing a number equal to or greater than one unitary time corresponding to one period of the diffusion code and a time having a value represented by digits expressing a number smaller than the unitary time. The time represented by the digits expressing a number equal to or greater than the unitary time is represented by a sum of the reference time which is a time common to all the satellites and the differential time which varies from satellite to satellite. Accordingly, the position of a receiver can be found even in a condition where latest time information cannot be obtained or a condition where a signal transmitted by each satellite is weak such as a condition immediately following activation of the receiver so that a diffusion-code transmission time ti of the satellite cannot be confirmed.

7 Claims, 22 Drawing Sheets

FIG. 2

$$t_i = T_{ci} + T_{mi} \quad \cdots\cdots (1a)$$

$t_i$ : DIFFUSION-CODE TRANSMISSION TIME
$T_{ci}$ : VALUE OF DIGITS EXPRESSING A NUMBER SMALLER THAN 1 msec
 (PHASE OF DIFFUSION CODE)
$T_{mi}$ : VALUE OF DIGITS EXPRESSING A NUMBER EQUAL TO OR GREATER THAN 1 msec $$t_i = T_{ci} + T_i + t_o \quad \cdots\cdots (1b)$$

$t_i$ : DIFFUSION-CODE TRANSMISSION TIME
$T_{ci}$ : VALUE OF DIGITS EXPRESSING A NUMBER SMALLER THAN 1 msec (PHASE OF DIFFUSION CODE)
$(T_i + t_o)$ : VALUE OF DIGITS EXPRESSING A NUMBER EQUAL TO OR GREATER THAN 1 msec
$t_o$ : REFERENCE TIME (COMMON TO SATELLITES)
$T_i$ : DIFFERENTIAL TIME

FIG. 3

$$f_i(X_o, \tau, t_o) = |X_i(t_i) - X_o| - c\{(t_r - t_i) + \tau\}$$
$$= |X_i(T_{ci} + T_i + t_o) - X_o|$$
$$-c\{t_r - (T_{ci} + T_i + t_o) + \tau\} = 0$$

$$\cdots\cdots(2)$$

$$X_i(t_i) = (x_i(t_i)\ y_i(t_i)\ z_i(t_i))^T \quad \cdots\cdots(3)$$

$$X_o = (x_o\ y_o\ z_o)^T \quad \cdots\cdots(4)$$

$$f_1(X_o, \tau, t_o) = |X_1(T_{c1} + T_1 + t_o) - X_o|$$
$$-c\{t_r - (T_{c1} + T_1 + t_o) + \tau\} = 0$$
$$\cdots\cdots(2a)$$

$$f_2(X_o, \tau, t_o) = |X_2(T_{c2} + T_2 + t_o) - X_o|$$
$$-c\{t_r - (T_{c2} + T_2 + t_o) + \tau\} = 0$$
$$\cdots\cdots(2b)$$

$$f_3(X_o, \tau, t_o) = |X_3(T_{c3} + T_3 + t_o) - X_o|$$
$$-c\{t_r - (T_{c3} + T_3 + t_o) + \tau\} = 0$$
$$\cdots\cdots(2c)$$

$$f_4(X_o, \tau, t_o) = |X_4(T_{c4} + T_4 + t_o) - X_o|$$
$$-c\{t_r - (T_{c4} + T_4 + t_o) + \tau\} = 0$$
$$\cdots\cdots(2d)$$

$$f_5(X_o, \tau, t_o) = |X_5(T_{c5} + T_5 + t_o) - X_o|$$
$$-c\{t_r - (T_{c5} + T_5 + t_o) + \tau\} = 0$$
$$\cdots\cdots(2e)$$

FIG. 4

POINT OF INTEREST $(X_o(n), \tau(n), t_o(n))$ ......(11)

$$\Delta f_i = \frac{\partial f_i}{\partial x_o(n)}\Delta x_o + \frac{\partial f_i}{\partial y_o(n)}\Delta y_o + \frac{\partial f_i}{\partial z_o(n)}\Delta z_o$$
$$+ \frac{\partial f_i}{\partial \tau(n)}\Delta \tau + \frac{\partial f_i}{\partial t_o(n)}\Delta t_o \quad \cdots\cdots(12)$$

$f_i(X_o(n), \tau(n), t_o(n)) + \Delta f_i = 0$ ......(13)

$(\Delta X_o, \Delta \tau, \Delta t_o)$ ......(14)

$\Delta X_o = (\Delta x_o \ \Delta y_o \ \Delta z_o)^T$ ......(15)

$\frac{\partial f_i}{\partial x_o(n)} = \frac{\partial f_i}{\partial x_o}\bigg|_{x_o = x_o(n)}$ ......(16)

$F(X_o(n), \tau(n), t_o(n)) + \Delta F$
$= F(X_o(n), \tau(n), t_o(n)) + J(X_o(n), \tau(n), t_o(n)) \Delta P$
$= 0$ ......(17)

$F = (f_1 \ f_2 \ f_3 \ f_4 \ f_5)^T$ ......(18)

$\Delta P = (\Delta x_o \ \Delta y_o \ \Delta \tau \ \Delta t_o)^T$ ......(19)

FIG. 5

$$J(Xo(n), \tau(n), to(n)) = \begin{bmatrix} \dfrac{\partial f1}{\partial xo(n)} & \dfrac{\partial f1}{\partial yo(n)} & \dfrac{\partial f1}{\partial zo(n)} & \dfrac{\partial f1}{\partial \tau(n)} & \dfrac{\partial f1}{\partial to(n)} \\ \dfrac{\partial f2}{\partial xo(n)} & \dfrac{\partial f2}{\partial yo(n)} & \dfrac{\partial f2}{\partial zo(n)} & \dfrac{\partial f2}{\partial \tau(n)} & \dfrac{\partial f2}{\partial to(n)} \\ \dfrac{\partial f3}{\partial xo(n)} & \dfrac{\partial f3}{\partial yo(n)} & \dfrac{\partial f3}{\partial zo(n)} & \dfrac{\partial f3}{\partial \tau(n)} & \dfrac{\partial f3}{\partial to(n)} \\ \dfrac{\partial f4}{\partial xo(n)} & \dfrac{\partial f4}{\partial yo(n)} & \dfrac{\partial f4}{\partial zo(n)} & \dfrac{\partial f4}{\partial \tau(n)} & \dfrac{\partial f4}{\partial to(n)} \\ \dfrac{\partial f5}{\partial xo(n)} & \dfrac{\partial f5}{\partial yo(n)} & \dfrac{\partial f5}{\partial zo(n)} & \dfrac{\partial f5}{\partial \tau(n)} & \dfrac{\partial f5}{\partial to(n)} \end{bmatrix}$$

...... (21)

$$\dfrac{\partial fi}{\partial xo(n)} = -\dfrac{xi(Tci+Ti+to(n))-xo(n)}{|Xi(Tci+Ti+to(n))-Xo(n)|} \quad \cdots\cdots (22)$$

$$\dfrac{\partial fi}{\partial yo(n)} = -\dfrac{yi(Tci+Ti+to(n))-yo(n)}{|Xi(Tci+Ti+to(n))-Xo(n)|} \quad \cdots\cdots (23)$$

$$\dfrac{\partial fi}{\partial zo(n)} = -\dfrac{zi(Tci+Ti+to(n))-zo(n)}{|Xi(Tci+Ti+to(n))-Xo(n)|} \quad \cdots\cdots (24)$$

$$\dfrac{\partial fi}{\partial \tau o(n)} = -c \quad \cdots\cdots (25)$$

$$\dfrac{\partial fi}{\partial To(n)} = -\dfrac{(Xi(Tci+Ti+to(n))-Xo(n)) \cdot Vi(Tci+Ti+to(n))}{|Xi(Tci+Ti+to(n))-Xo(n)|} + C$$

...... (26)

$$A \cdot B = (Xi(Tci+Ti+to(n))-Xo(n)) \cdot Vi(Tci+Ti+to(n)) \quad \cdots\cdots (27)$$

F I G. 6

INITIAL VALUES $(X_o(0), \tau(0), t_o(0)) = (X_{oa}, 0, t_{oa})$ ......(31)

$X_o(0) = X_{oa}$: APPROXIMATE POSITION OF RECEIVER
$\tau(0)$: INITIAL VALUE OF ERROR $\tau$ OF RECEIVER INTERNAL CLOCK
$t_o(0) = t_{oa}$: INITIAL VALUE OF REFERENCE TIME $t_o$ OF RECEIVER INTERNAL CLOCK
(TIME INDICATED BY INTERNAL CLOCK OF RECEIVER AT ITERATION COMPUTATION START TIME)

FIG. 7

NEXT POINT OF INTEREST $(Xo(n+1), \tau(n+1), to(n+1))$
  $= (Xo(n) + \Delta Xo, \tau(n) + \Delta \tau, to(n) + \Delta to)$
  ...... (33)

CONVERGENCE CRITERIA ($\varepsilon$ : CONSTANT)

$|\Delta Xo| < \varepsilon$ ...... (35)

$|\Delta P| < \varepsilon$ ...... (36)

$|F(Xo(n), \tau(n), to(n))| < \varepsilon$ ...... (37)

FIG. 8

CALCULATION OF DIFFERENTIAL TIME Ti

$t1 = Tc1 + to$ ...... (1c)

$ti = Tci + Ti + to \quad (i \geq 2)$ ...... (1d)

$Ti = (Ti + to) - to = (ti - Tci) - (t1 - Tc1)$ ...... (41)

$c(tr - ti) = |Xi(ti) - Xo|$ ...... (42)

$ti = tr - \dfrac{|Xi(ti) - Xo|}{c}$ ...... (43)

$t1 = tr - \dfrac{|X1(t1) - Xo|}{c}$ ...... (44)

$Ti = \left(\dfrac{|X1(t1) - Xo|}{c} + Tc1\right) - \left(\dfrac{|Xi(ti) - Xo|}{c} + Tci\right)$ ...... (45)

$c \times 1.0 \times 10^{-3} \, [m] \simeq 3.0 \times 10^{5} \, [m]$ ...... (46)

$ti = t1 - 2.0 \times 10^{-2} \, [\text{SECONDS}]$ ...... (47)

FIG. 9

TOLERANCE OF APPROXIMATE POSITION OF RECEIVER

$$cTi = (|X1(t1)-Xo| + cTc1) - (|Xi(ti)-Xo| + cTci) \quad \cdots (51)$$

$$\begin{aligned}
&(|X1(t1)-(Xo+\Delta X)| + cTc1) \\
&\quad -(|Xi(ti)-(Xo+\Delta X)| + cTci) \\
&= (|X1(t1)-Xo| + |\Delta X| + cTc1) \\
&\quad -(|Xi(ti)-Xo| - |\Delta X| + cTci) \\
&= (|X1(t1)-Xo| + cTc1) \\
&\quad -(|Xi(ti)-Xo| + cTci) + 2|\Delta X| \\
&= cTi + 2|\Delta X| \quad \cdots (52)
\end{aligned}$$

$|\Delta X|$ : DISTANCE BETWEEN COORDINATES REPRESENTING APPROXIMATE POSITION OF RECEIVER AND ACTUAL POSITION OF RECEIVER $$|A| > |B| \quad \cdots (63)$$

$$|A| - |B| \leq |A-B| \leq |A| + |B| \quad \cdots (64)$$

$$|Xi(ti)-(Xo+\Delta X)| = |(Xi(ti)-Xo)-\Delta X| \quad \cdots (65)$$

$$A = Xi(ti) - Xo \quad \cdots (66)$$

$$B = \Delta X \quad \cdots (67)$$

$$|Xi(ti)-Xo| - |\Delta X| \leq |(Xi(ti)-Xo)-\Delta X| \leq |Xi(ti)-Xo| + |\Delta X| \quad \cdots (68)$$

FIG. 10

TOLERANCE OF ERROR OF RECEIVER INTERNAL TIME $t1 + \Delta t = ti + \Delta t + 2.0 \times 10^{-2}$ [SECONDS] ······(53)

$(|X1(t1+\Delta t) - Xo| + cTc1)$
$\quad - (|Xi(t1+\Delta t) - Xo| + cTci)$
$= (|X1(t1+\Delta t) - Xo| + cTc1)$
$\quad - (|Xi(ti+\Delta t+2.0 \times 10^{-2}) - Xo| + cTci)$
$= (|X1(t1) - Xo| + \Delta t \times 1.0 \times 10^3 + cTc1)$
$\quad - (|Xi(ti) - Xo| - \Delta t + 2.0 \times 10^{-2}) \times 1.0 \times 10^3 + cTci)$
$= (|X1(t1) - Xo| + cTc1) - (|Xi(ti) - Xo| + cTci)$
$\quad + (2\Delta t + 2.0 \times 10^{-2}) \times 1.0 \times 10^3$
$= cTi + (2\Delta t + 2.0 \times 10^{-2}) \times 1.0 \times 10^3$ ······(54)

$\Delta d = (2\Delta t + 2.0 \times 10^{-2}) \times 1.0 \times 10^3$ [m]
$\quad \simeq 2\Delta t \times 1.0 \times 10^3$ [m] ······(55)

FIG. 11

$$2|\Delta X|+2|\Delta t| \times 1.0 \times 10^3 < 1.5 \times 10^5 \quad \cdots\cdots (56)$$

$$|\Delta X|+1.0 \times 10^3 \times |\Delta t| < 7.5 \times 10^4 \quad \cdots\cdots (57)$$

FIG. 12

SECOND METHOD

$$f_1(X_o, \tau, t_o) = |X_1(T_{c1}+T_1+t_o)-X_o| \\ -c\{t_r-(T_{c1}+T_1+t_o)+\tau\} = 0 \quad \cdots(2a)$$

$$f_2(X_o, \tau, t_o) = |X_2(T_{c2}+T_2+t_o)-X_o| \\ -c\{t_r-(T_{c2}+T_2+t_o)+\tau\} = 0 \quad \cdots(2b)$$

$$f_3(X_o, \tau, t_o) = |X_3(T_{c3}+T_3+t_o)-X_o| \\ -c\{t_r-(T_{c3}+T_3+t_o)+\tau\} = 0 \quad \cdots(2c)$$

$$f_4(X_o, \tau, t_o) = |X_4(T_{c4}+T_4+t_o)-X_o| \\ -c\{t_r-(T_{c4}+T_4+t_o)+\tau\} = 0 \quad \cdots(2d)$$

$$f_5(X_o, \tau, t_o) = |X_5(T_{c5}+T_5+t_o)-X_o| \\ -c\{t_r-(T_{c5}+T_5+t_o)+\tau\} = 0 \quad \cdots(2e)$$

$$f_6(X_o, \tau, t_o) = |X_6(T_{c6}+T_6+t_o)-X_o| \\ -c\{t_r-(T_{c6}+T_6+t_o)+\tau\} = 0 \quad \cdots(2f)$$

$$\Delta P = (J^T J)^{-1} J^T (-F) \quad \cdots(61)$$

FIG. 13

THIRD METHOD

$$f5(Xo) = |Xo| - |Xoa| = 0 \quad \cdots\cdots (71)$$
$Xoa$: APPROXIMATE POSITION OF RECEIVER $$\frac{\partial f5}{\partial xo(n)} = \frac{xo(n)}{|Xo(n)|} \quad \cdots\cdots (72)$$

$$\frac{\partial f5}{\partial yo(n)} = \frac{yo(n)}{|Xo(n)|} \quad \cdots\cdots (73)$$

$$\frac{\partial f5}{\partial zo(n)} = \frac{zo(n)}{|Xo(n)|} \quad \cdots\cdots (74)$$

$$\frac{\partial f5}{\partial \tau(n)} = 0 \quad \cdots\cdots (75)$$

$$\frac{\partial f5}{\partial to(n)} = 0 \quad \cdots\cdots (76)$$

FIG. 22A

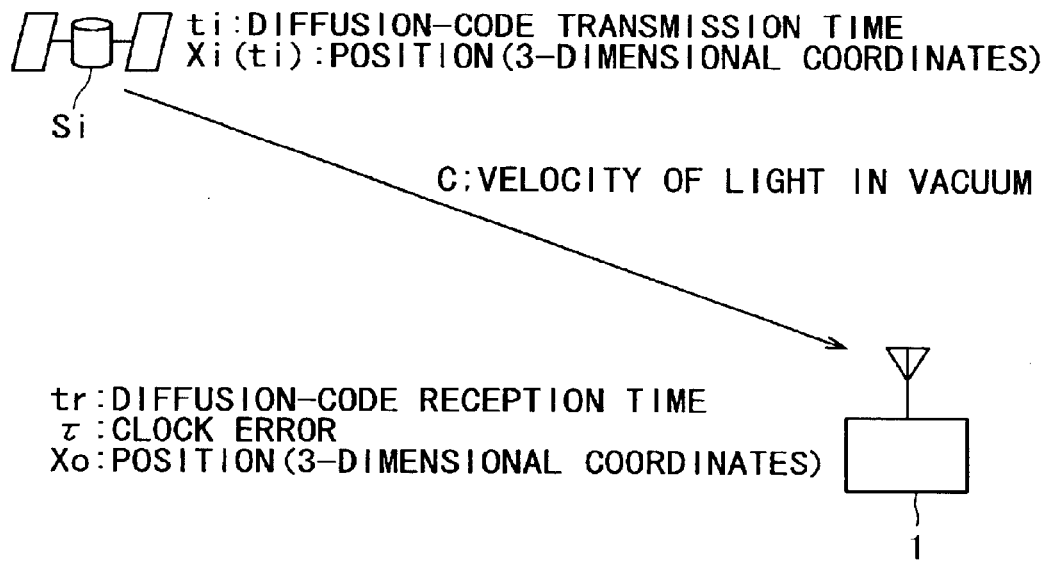

Si — $t_i$: DIFFUSION-CODE TRANSMISSION TIME
$X_i(t_i)$: POSITION (3-DIMENSIONAL COORDINATES)

C: VELOCITY OF LIGHT IN VACUUM $t_r$: DIFFUSION-CODE RECEPTION TIME
$\tau$: CLOCK ERROR
$X_o$: POSITION (3-DIMENSIONAL COORDINATES)

FIG. 22B $$|X_i(t_i) - X_o| - c\{(t_r - t_i) + \tau\} = 0 \quad \cdots (91)$$

$$X_i(t_i) = (x_i(t_i) \; y_i(t_i) \; z_i(t_i))^T \quad \cdots (92)$$

$$X_o = (x_o \; y_o \; z_o)^T \quad \cdots (93)$$

$$|X_1(t_1) - X_o| - c\{(t_r - t_1) + \tau\} = 0 \quad \cdots (91a)$$

$$|X_2(t_2) - X_o| - c\{(t_r - t_2) + \tau\} = 0 \quad \cdots (91b)$$

$$|X_3(t_3) - X_o| - c\{(t_r - t_3) + \tau\} = 0 \quad \cdots (91c)$$

$$|X_4(t_4) - X_o| - c\{(t_r - t_4) + \tau\} = 0 \quad \cdots (91d)$$

$$f_4(X_o) = |X_o| - |X_{oa}| = 0 \quad \cdots (95)$$

$X_{oa}$: APPROXIMATE POSITION OF RECEIVER

POSITIONING RECEIVER AND POSITIONING CALCULATION METHOD

BACKGROUND OF THE INVENTION

The present invention relates to a method, which is adopted in a positioning system based on satellites and is used for determining the position of a positioning receiver, as well as relates to the positioning receiver itself.

As a positioning system based on satellites, a GPS (Global Positioning System) developed by the US is widely used.

In the GPS, a GPS receiver receives diffusion codes and navigation messages including time information and locus information, from GPS satellites moving around the earth. The GPS receiver then calculates the position of the receiver itself. Finally, the GPS receiver displays the calculated position to the user.

To put it concretely, a diffusion code received by a receiver designed for the public is a spectrum diffusion signal referred to as a C/A (Clear and Acquisition) code in an L1 band of 1575.42 MHz.

A C/A code is typically obtained as a result of a BPSK (Binary Phase Shift Keying) modulation process carried out on a carrier with a frequency of 1,575.42 MHz by using a signal diffusing 50-bps (bits per second) data through the use of a PN (Pseudorandom Noise) code having a chip rate of 1.023 MHz and a code length of 1,023. An example of the PN code is a gold code. As shown at the top of FIG. 20, the C/A code comprises a repetition of diffusion codes (PN codes) at a period of 1,023 chips. The period of 1,023 chips is 1 msec in length.

The diffusion code varies from satellite to satellite. However, the receiver is capable of determining which satellite generates a received diffusion code. A satellite generates a diffusion code, which is assigned to the satellite, synchronously with an atomic clock employed in the satellite, and transmits the diffusion code.

As shown in FIG. 20, the data of a navigation message is transmitted at 50 bps, that is, 1 bit per 20 msec, which accommodate 20 periods of the diffusion code. For a bit with a value of 1, the 1,023 chips in one period of the diffusion code, that is, the 1,023 chips in 1 msec, are opposite to those for a bit with a value of 0.

A navigation message is transmitted in main-frame units. Each main frame having a duration of 30 seconds comprises five sub-frames, namely, first to fifth subframes. Each sub-frame having a duration of 6 seconds comprises 10 words (or 300 bits). Thus, each word has a duration of 600 msec and comprises 30 bits.

As shown in FIG. 21, the first and second words of each of the first to fifth sub-frames are a TLM (telemeter) word and a HOW (Handover Word) respectively.

The first word used as a TLM word includes a preamble at the first to eighth bits and a TLM message at the ninth to twenty-second bits. The preamble has a fixed prescribed pattern independent of the data included in the TLM message. The ninth bit and the twenty-second bit are referred to as MSB (Most Significant Bit) and LSB (Least Significant Bit) of the TLM message respectively.

The second word used as a HOW includes a TOW (Time of Week) count message at the first to seventeenth bits and a sub-frame ID, which is an identification code, at the twentieth to twenty-second bits. The first bit and the seventeenth bit are referred to as MSB and LSB of the TOW count message respectively.

In each satellite, the TOW count message, which is time information, is counted up every 6 seconds, beginning at a predetermined start time, synchronously with the atomic clock employed in the satellite. The period of 6 seconds is the duration of a sub-frame.

From the TOW count message, the receiver is capable of detecting the time, at which a diffusion code is transmitted from the satellite, every 6 seconds. During the period of 6 seconds, digits of the diffusion-code transmission time expressing a number equal to or greater than 1 msec are generated on the basis of an epoch or a data acquisition time interval of 1 msec obtained in a process of demodulating information on a locus.

In addition, since the period of a diffusion code is 1 msec in length, the phase of the diffusion code corresponds to the value of the digits of the diffusion-code transmission time expressing a number smaller than 1 msec. Thus, by detecting the phase of the diffusion code, it is possible to confirm the pattern of the digits of the diffusion-code transmission time expressing a number smaller than 1 msec.

The TOW count message is received for every sub-frame, which has a duration of 6 seconds. In actuality, however, in order to confirm the information on time, it is necessary to recognize the head of the sub-frame and acquire data A corresponding to the TOW count message. In addition, it is necessary to further acquire data B corresponding to the TOW count message at a location, which is considered to be the next sub-frame, and to verify that the equation B=A+1 holds true. By carrying out these operations, the boundary between the sub-frames and the time information are confirmed at the same time.

For this reason, after the receiver is activated, it takes at least about 6 seconds to confirm the transmission time of a diffusion code. When the receiver receives data, starting with that in the middle of a sub-frame, it takes up to about 12 seconds to confirm the transmission time of a diffusion code.

Locus information unique to each satellite is inserted into the third and subsequent words of 3 sub-frames, namely, the first to third sub-frames, transmitted by the satellite. The unique locus information is referred to as ephemeris information. Locus information common to all satellites is inserted into the third and subsequent words of 2 sub-frames, namely, the fourth to fifth sub-frames, transmitted by the satellites. The common locus information is referred to as almanac information.

The ephemeris information is a parameter used for finding the locus of a satellite transmitting the ephemeris information. The ephemeris information is locus information having high precision. The ephemeris information is transmitted by the satellite repeatedly for each main frame and updated in a relatively frequent manner in accordance with control executed by a control station located on the ground.

The receiver stores the ephemeris information in a memory to be used for calculation of the position of the receiver. From the precision point of view, however, the life of the ephemeris information or the period in which the ephemeris information can be used is only about 2 hours. For this reason, it is necessary to monitor the time lapsing since a point of time at which the ephemeris information is stored in the memory. As the length of the monitored time exceeds the life of the ephemeris information, the information stored in the memory is updated by storing new ephemeris information.

In order to acquire new ephemeris information to be used for updating that stored in the memory, however, at least 3 sub-frames, that is, the first to third sub-frames with a total duration of 18 seconds are required. When the receiver receives data, starting with that in the middle of the main frame, it takes up to about 30 seconds corresponding to the duration of a main frame to update the ephemeris information stored in the memory.

The almanac information includes information showing approximate positions of all satellites and information indicating which satellites can be used. In order to obtain the entire almanac information, data of 25 main frames or a master frame with a duration of 750 seconds is required. The almanac information is locus information updated at intervals of several days in accordance with control executed by a control station located on the ground.

The life of the almanac information is several months. If the almanac information is stored in a memory employed in the receiver, normally, the information is updated at intervals of several months. By storing the almanac information in a memory employed in the receiver, it is possible to determine which satellite is to be assigned to any channel after the power supply is turned on.

In the calculation of a position, as shown in FIGS. 22A and 22B, symbol ti denotes the diffusion-code transmission time for the ith satellite Si, symbol Xi (ti) denotes the position (or the 3-dimensional coordinates) of the satellite Si at the time ti and symbol tr denotes a value measured by a clock in a receiver 1. The measured time is a time at which the diffusion code transmitted by the satellite Si is received by the receiver 1. In addition, symbol Xo denotes the position (or the 3-dimensional coordinates) of the target receiver 1. The distance from the satellite Si to the receiver 1 is expressed by Eq. (91) where symbol c denotes the velocity of light in a vacuum.

It is to be noted that the position Xi (ti) of the satellite Si is a vector expressed by Eq. (92) where symbol T at the right end of the expression on the right-hand side of the equation indicates that the expression on the right-hand side of the equation is a transpose vector. The position Xi (ti) of the satellite Si is obtained from the ephemeris information described above. The position Xo of the receiver 1 is a vector expressed by Eq. (93) where symbol T at the right end of the expression on the right-hand side of the equation indicates that the expression on the right-hand side of the equation is a transpose vector. Symbol $\tau$ denotes an error of the clock employed in the receiver 1.

The satellites use a common time generated by atomic clocks employed in the satellites. A signal originated from each of the satellites is transmitted from the satellite synchronously with the atomic clock. However, a time indicated by the clock in the receiver has an error $\tau$ relative to the corresponding time of the satellites. Thus, Eq. (91) includes 4 unknown quantities, namely, xo, yo, zo and $\tau$.

Thus, the equation expressed by Eq. (91) needs to be established for at least 4 satellites, that is, for i=1 to 4, as shown by Eqs. (91a) to (91d). By solving the simultaneous equations (91a) to (91d), the 3-dimensional coordinates xo, yo and zo of the receiver can be found.

The simultaneous equations (91a) to (91d) are each a quadratic equation including no term representing a product of different unknown quantities. In general, the simultaneous equations (91a) to (91d) can be solved by assuming proper initial values close to the solutions and then applying an iteration method such as Newton's method. Newton's method is a method by which a given equation is approximated as a linear equation locally at a point close to the solution to the given equation. Thus, in this case, linear simultaneous equations are initially solved by using initial values. Then, the resulting solutions are used as next initial values to again find next solutions. This process is repeated iteratively till the solutions converge to values with errors in a predetermined range in order to find the final solutions.

In accordance with the conventional method to calculate the value of a measured position as described above, however, the diffusion-code transmission time ti of each satellite Si is confirmed, the position Xi (ti) of each satellite Si is then found and, finally, the 3-dimensional coordinates of the receiver are calculated by solving the simultaneous equations (91a) to (91d). Thus, in a condition where the latest TOW count message cannot be obtained or a condition where a signal transmitted by each of the satellites is weak, information on a locus cannot be modulated in spite of the fact that the phase of the diffusion code has been obtained. An example of the condition where the latest TOW count message cannot be obtained or the condition where a signal transmitted by each of the satellites is weak is a condition immediately following activation of the receiver. In a condition where an epoch of a 1-msec unit cannot be obtained, the digits of the diffusion-code transmission time expressing a number equal to or greater than 1 msec cannot be confirmed so that it is impossible to obtain an accurate diffusion-code transmission time ti. As a result, the 3-dimensional coordinates of the receiver cannot be calculated.

SUMMARY OF THE INVENTION

It is thus an object of the present invention to provide a positioning calculation method that can be adopted for calculating the position of a receiver even in a condition where the latest information on time cannot be obtained or a condition where the diffusion-code transmission time of a satellite cannot be confirmed because a signal transmitted by the satellite is weak such as a condition immediately following activation of the receiver.

According to an aspect of the present invention, a positioning receiver includes:
phase confirmation means for receiving a signal from each of at least five satellites, locus information of each of which has been received, and confirming the phase of a diffusion code in a condition where the locus information has been obtained from each of the satellites as well as an approximate present time and an approximate position of a receiver is already known; and
coordinate calculation means for establishing at least five simultaneous equations for the at least five satellites respectively to represent a relation between the positions of each of the satellites as well as the receiver and a time required by the diffusion code to arrive at the receiver, and solving the at least five simultaneous equations in order to calculate 3-dimensional coordinates of the receiver.

The at least five simultaneous equations include at least five unknown quantities, namely, a reference time, an error of a clock for measuring a diffusion-code reception time for each of the satellites and the 3-dimensional coordinates of the receiver.

The diffusion code is transmitted from each of the satellites at a diffusion-code transmission time expressed as a sum of a time having a value represented by digits expressing a number equal to or greater than one unitary time corresponding to one period of the diffusion code and a time having a value represented by digits expressing a number smaller than the unitary time.

The time represented by the digits expressing a number equal to or greater than the unitary time is represented by a sum of the reference time which is a time common to all the satellites and a differential time which varies from satellite to satellite.

According to another aspect of the present invention, there is provided a positioning calculation method for calculating 3-dimensional coordinates of a receiver in a condition where signals are received from at least five satellites, the phase of a diffusion code and locus information have been obtained from each of the satellites, an approximate present time has been obtained and an approximate position of the receiver is already known.

The positioning calculation method establishes at least five simultaneous equations for the at least five satellites respectively to represent a relation between the positions of each of the satellites as well as the receiver and a time required by the diffusion code to arrive at the receiver, and solves the at least five simultaneous equations in order to calculate 3-dimensional coordinates of the receiver.

The at least five simultaneous equations include at least five unknown quantities, namely, a reference time, an error of a clock for measuring a diffusion-code reception time for each of the satellites and the 3-dimensional coordinates of the receiver.

The diffusion code is transmitted from each of the satellites at a diffusion-code transmission time expressed as a sum of a time having a value represented by digits expressing a number equal to or greater than one unitary time corresponding to one period of the diffusion code and a time having a value represented by digits expressing a number smaller than the unitary time.

The time represented by the digits expressing a number equal to or greater than the unitary time is represented by a sum of the reference time which is common to all the satellites and a differential time which varies from satellite to satellite.

In accordance with the present invention, even in a condition where the latest time information cannot be obtained or a condition where a signal transmitted by each of the satellites is weak such as a condition immediately following activation of the receiver so that the diffusion-code transmission times of the satellites cannot be confirmed, the position of a receiver can be found. Thus, immediately following activation of the receiver, the time to the first positioning can be shortened substantially and, in a condition where a signal transmitted by each of the satellites is weak, the improvement of the positioning rate can be realized.

In addition, if the positioning calculation process is carried out only at a request made by the user in order to reduce the power consumption, the operating time of the receiver can be shortened so that the power consumption can be indeed reduced.

BRIEF DESCRIPTION OF THE DRAWINGS

FIG. 2 is an explanatory diagram referred to in a description of positioning calculation methods provided by the present invention;

FIG. 3 is a diagram showing simultaneous equations used in a first method;

FIG. 4 is a diagram showing a method to solve the simultaneous equations shown in FIG. 3;

FIG. 5 is a diagram showing a method to solve the simultaneous equations shown in FIG. 3;

FIG. 6 is a diagram showing a method to solve the simultaneous equations shown in FIG. 3;

FIG. 7 is a diagram showing a method to solve the simultaneous equations shown in FIG. 3;

FIG. 8 is a diagram showing a method to calculate a differential time;

FIG. 9 is an explanatory diagram referred to in a description of a tolerance for an approximate position of the receiver;

FIG. 10 is an explanatory diagram referred to in a description of a tolerance for an error of an internal clock employed in the receiver;

FIG. 11 is an explanatory diagram referred to in a description of the tolerances;

FIG. 12 is a diagram showing simultaneous equations used in a second method;

FIG. 13 is a diagram showing simultaneous equations used in a third method;

FIGS. 22A and 22B are explanatory diagrams referred to in a description of the conventional positioning calculation method.

DESCRIPTION OF THE PREFERRED EMBODIMENTS

Preferred embodiments of the present invention are described below for a case in which the GPS is used as a positioning system.

Figure 1:
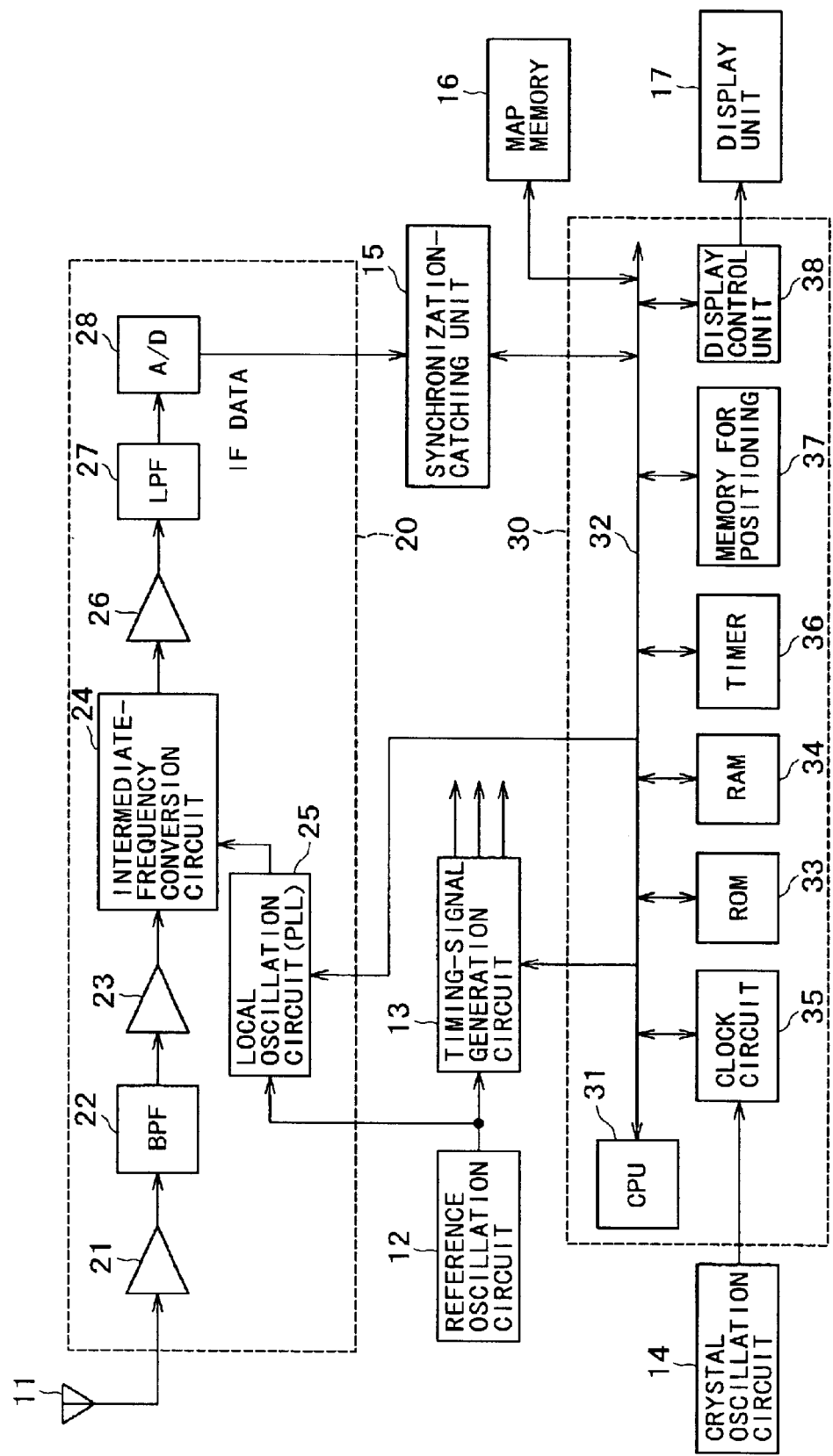
FIG. 1 is a block diagram showing an embodiment implementing a positioning receiver provided by the present invention.

Embodiment of Positioning Receiver: FIG. 1

FIG. 1 is a diagram showing an embodiment implementing a GPS receiver used as a positioning receiver in accordance with the present invention.

A receiver of the present embodiment comprises an antenna 11, a frequency conversion unit 20, a reference oscillation circuit 12, a timing-signal generation circuit 13, a crystal oscillation circuit 14, a synchronization-catching unit 15, a control/processing unit 30, a map memory 16 and a display unit 17. The reference oscillation circuit 12 is typically a crystal oscillation circuit having a temperature compensation function. The display unit 17 is typically a liquid-crystal display unit.

The timing-signal generation circuit 13 is a circuit for either multiplying or dividing the frequency of a reference clock signal, which is generated by the reference oscillation circuit 12, in order to generate a variety of clock and timing signals required by other components employed in the receiver.

The control/processing unit 30 is a component for measuring and calculating a position as well as controlling other components employed in the receiver. The control/processing unit 30 has a CPU 31 connected to other components of the control/processing unit 30 by a bus 32. The other components employed in control/processing unit 30 includes a ROM 33, a RAM 34, a clock circuit 35, a timer 36, a memory for positioning 37 and a display control unit 38. The ROM 33 is a component for storing programs to be executed by the CPU 31 and necessary constant data. The programs include a positioning calculation routine. The RAM 34 is component used as, among others, a work area for the CPU 31. The clock circuit 35 is a circuit for counting clock pulses, which are generated by the crystal oscillation circuit 14, in order to find the present time. The timer 36 is a unit for generating a variety of timing signals required for operating other components employed in the receiver. The timer 36 is also a component for referencing a time. In addition, the CPU 31 is also connected to the aforementioned map memory 16 by the bus 32.

The memory for positioning 37 is a non-volatile memory for storing ephemeris information, almanac information and information on positions. As described above, the ephemeris information and the almanac information are information on loci of satellites whereas the information on positions is a positioning result. The ephemeris information is updated typically every 2 hours while the almanac information is updated typically every several days or several months.

The map memory 16 is an internal memory or an external memory such as a memory card. The map memory 16 is a memory for storing map information.

The antenna 11 is component for receiving a signal transmitted by each satellite. As described above, a signal transmitted by each satellite is a signal obtained as a result of a BPSK modulation process carried out on a carrier with a frequency of 1,575.42 MHz by using a signal (C/A code). The C/A code is a signal carrying out a spectrum-diffusing process on 50-bps data through the use of a diffusion code, which has a chip rate of 1.023 MHz and a code length of 1,023 and is determined for each satellite.

The 1,575.42-MHz signal received by the antenna 11 is supplied to a low-noise amplifier circuit 21 of the frequency conversion unit 20 to be amplified thereby. An amplified signal output by the low-noise amplifier circuit 21 is fed to a band-pass filter 22 for eliminating the signal's components in unnecessary bands. A signal output by the band-pass filter 22 is supplied to an intermediate-frequency conversion circuit 24 by way of a high-frequency amplifier circuit 23.

A reference clock signal generated by the reference oscillation circuit 12 is supplied to a local oscillation circuit 25 adopting a PLL (Phase Locked Loop) synthesizer technique. The local oscillation circuit 25 generates a local oscillation signal having a frequency whose ratio to the frequency of the reference clock signal generated by the reference oscillation circuit 12 is fixed. The local oscillation signal is supplied to the intermediate-frequency conversion circuit 24 for converting the frequency 1,575.42 MHz of the signal transmitted by each satellite into an appropriate intermediate frequency of typically 1.023 MHz.

Furthermore, the intermediate-frequency signal output by the intermediate-frequency conversion circuit 24 is supplied to an intermediate-frequency amplifier circuit 26 for amplifying the signal. A signal output by the intermediate-frequency amplifier circuit 26 is fed to a low-pass filter 27 for limiting the band of the signal. A signal output by the low-pass filter 27 is then supplied to an A/D converter 28 for converting the signal into a digital signal of 1 bit or 2 or more bits. This digital signal is referred to hereafter as IF data. The IF data is fed to the synchronization-catching unit 15.

The synchronization-catching unit 15 carries out a process of correlation between the diffusion code of the IF data or the diffusion code received from the satellite and a diffusion code which is generated by a diffusion-code generation circuit employed in the synchronization-catching unit 15 and has the same pattern as the diffusion code of the IF data. The synchronization-catching unit 15 carries out the correlation process in order to control the phase of the diffusion code generated by the diffusion-code generation circuit so that the diffusion code received from a satellite is synchronized to the diffusion code generated by the diffusion-code generation circuit and a correlation peak is detected. In this way, the satellite is caught and the phase of the diffusion code received from the satellite is detected.

A signal received by the antenna 11 includes diffusion codes transmitted by a plurality of satellites. For this reason, the synchronization-catching unit 15 generates diffusion codes each having the same pattern as the diffusion code received from each of the satellites. For each satellite the diffusion code of which is received by the receiver, the synchronization-catching process described above is carried out to detect the phase of the diffusion code.

The synchronization-catching process can be carried out in a 1-msec period, which is the period of the diffusion code. The synchronization-catching process is carried out to perform a spectrum-inverse-spreading process and to demodulate a navigation message including information on a time (TOW) and information on a locus, which are received from the satellite.

The control/processing unit 30 carries out a positioning calculation process based on a first, second or third method as will be described later to calculate the 3-dimensional coordinates of the receiver after the synchronization-catching unit 15 confirms the phase of a diffusion code.

The display control unit 38 controls the display unit 17 to show a calculated position on a map based on map information read out from the map memory 16.

Embodiments of Positioning Calculation Methods:
FIGS. 2 to 18
(Positioning Calculation Based on First Method: FIGS. 2 to 11)

<Outline of First Method: FIGS. 2 and 3>

Information on loci of the satellites and the 3-dimensional coordinates of the receiver are left in a memory employed in the receiver even immediately after the reactivation of the receiver provided that a period in which the power supply of the receiver was in an off state immediately before the receiver is activated again has been short. The information on loci stored in the memory is information, which was received immediately before the power supply was turned off. The 3-dimensional coordinates stored in the memory are coordinates obtained as a result of the last positioning calculation process. In the case of the embodiment shown in FIG. 1, the memory is the memory for positioning 37.

Due to the landform and/or constructions, electric waves transmitted by satellites are weakened. Even in this case, the 3-dimensional coordinates of the receiver and the information on loci of the satellites are obtained before the electric waves transmitted by satellites are weakened and stored in the memory employed in the receiver.

In addition, it is also possible to give the receiver information on loci of the satellites and the approximate position of the receiver from a source outside the receiver.

In the present invention, it is assumed that the information on loci of the satellites and the approximate position of the receiver are known. In addition, the clock employed in the receiver is also assumed not to go wrong so that the present time is known to a certain degree. In the case of the embodiment shown in FIG. 1, the clock is the clock circuit 35.

A tolerance defining a limit of the discrepancy between the approximate position of the receiver and the actual or correct present position and a tolerance defining a limit of the discrepancy between the time indicated by the internal clock of the receiver and the correct time will be described later.

In general, in the calculation of the 3-dimensional coordinates of the receiver, the 3-dimensional coordinates of each satellite are found first by using the diffusion-code transmission time of the satellite as information on a time.

Then, as indicated by Eq. (1a) shown in FIG. 2, the diffusion-code transmission time ti of the ith satellite Si is expressed as the sum of a value Tci and a value of Tmi where symbol Tci denotes the value of digits expressing a number smaller than 1 msec and symbol Tmi denotes the value of digits expressing a number equal to or greater than 1 msec.

Figure 20:
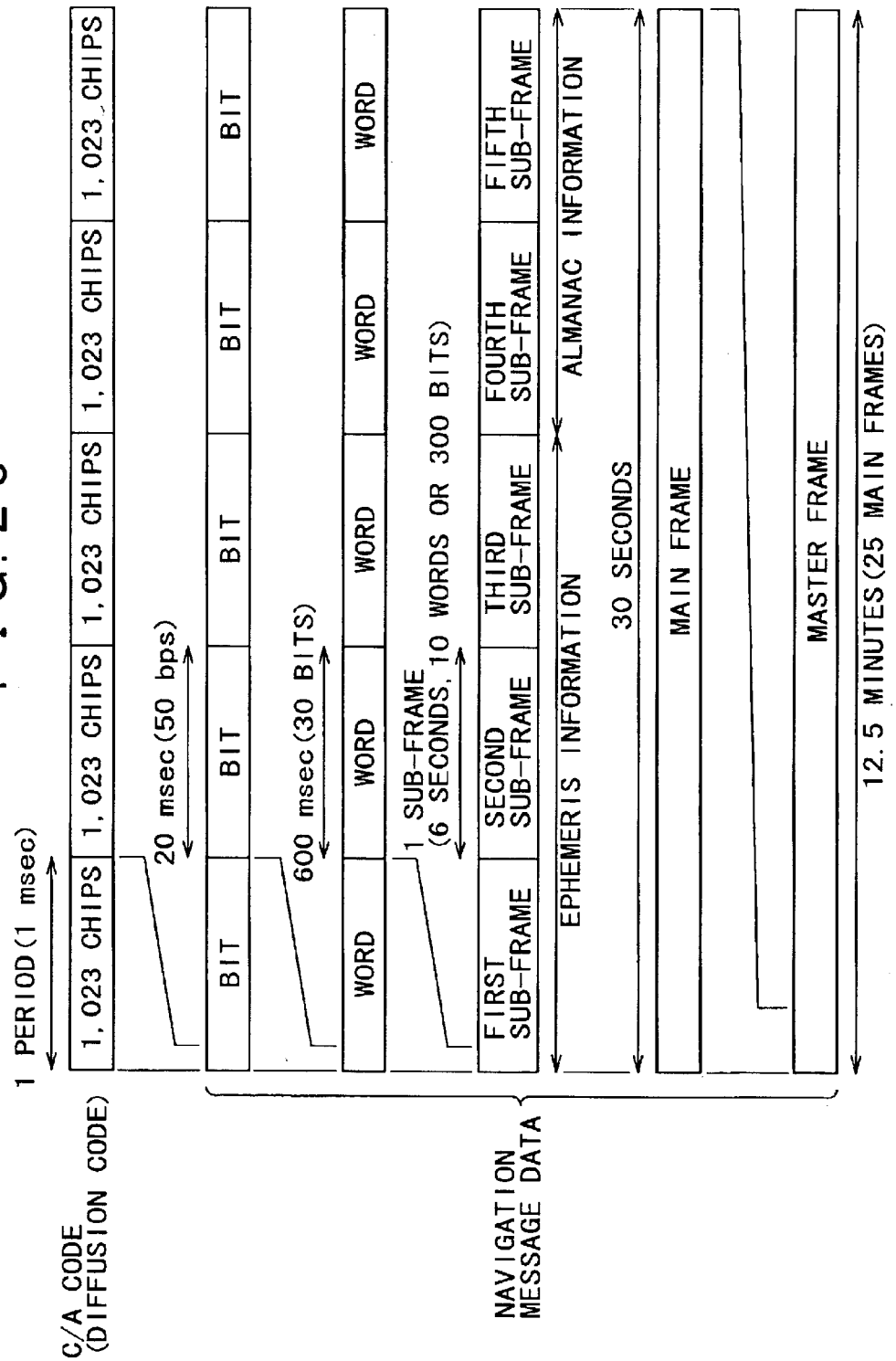
FIG. 20 is an explanatory diagram referred to in a description of a diffusion code and a navigation message, which are used in a GPS.
Figure 21:
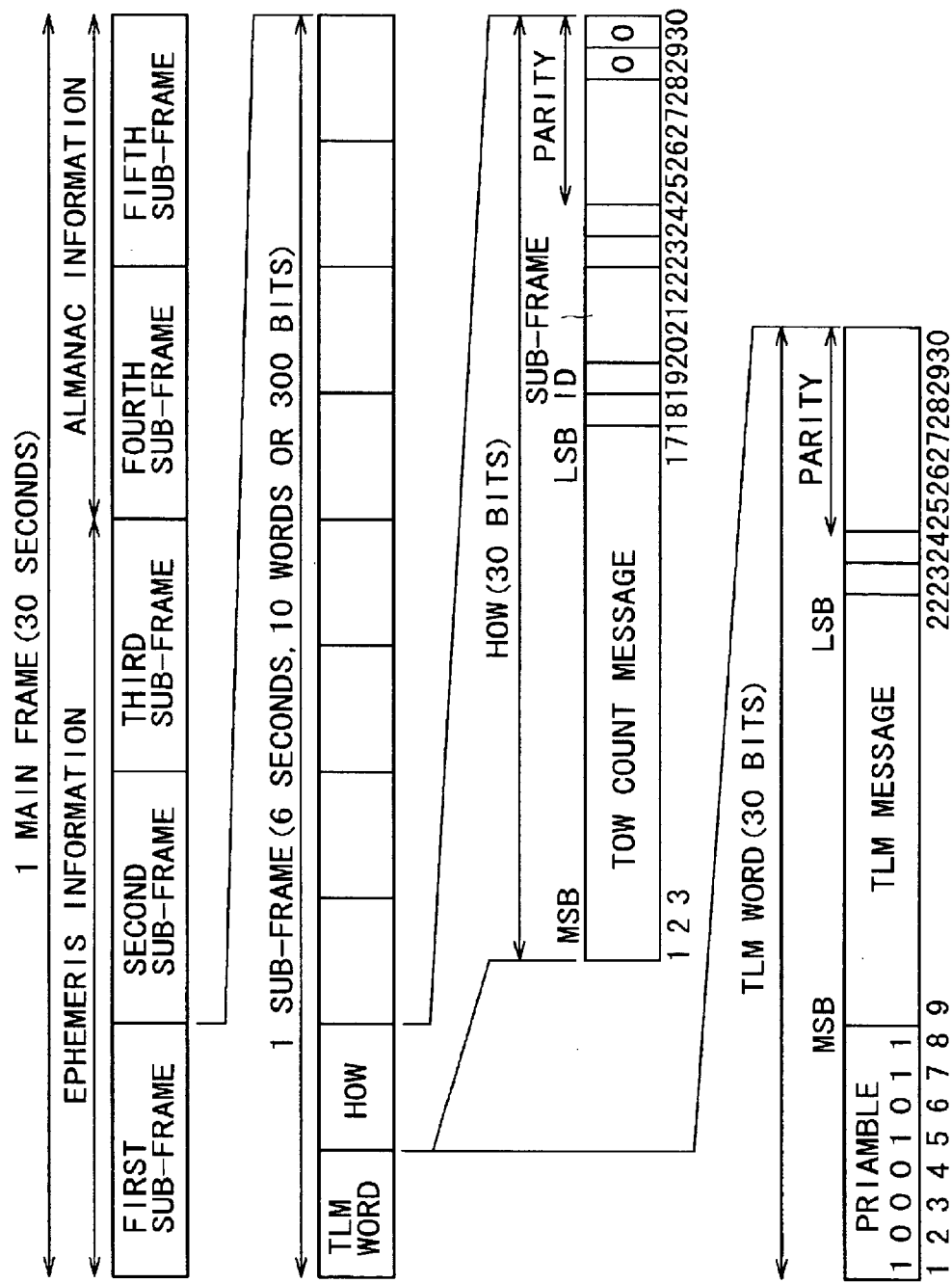
FIG. 21 is a diagram showing the format of a frame used in the GPS.

As described above, the phase of a diffusion code corresponds to the value Tci of digits expressing a number smaller than 1 msec, and the value Tmi of digits expressing a number equal to or greater than 1 msec is generated on the basis of a 1-msec unit of epoch obtained in a process of demodulating a TOW (Time of Week) count message included in navigation information (information on loci) shown in FIGS. 20 and 21 and demodulating the navigation message.

Thus, in order to calculate the 3-dimensional coordinates of a satellite, not only the phase of a diffusion code transmitted by the satellite is obtained, but the demodulation of the navigation message must also be in an enabled state. That is to say, even if the phase of the diffusion code can be detected, the 3-dimensional coordinates of the satellite cannot be confirmed unless the navigation message can be demodulated.

On the other hand, in accordance with the present invention, it is possible to calculate the 3-dimensional coordinates of a satellite by using only the phase of the diffusion code corresponding to the value Tci of digits expressing a number smaller than 1 msec. These digits are low-order digits of the diffusion-code transmission time ti.

For the reason described above, in the present invention, as indicated in Eq. (1b) shown in FIG. 2, the value Tmi of digits expressing a number equal to or greater than 1 msec is expressed by a sum of a reference time to and a differential time Ti. These digits are high-order digits of the diffusion-code transmission time ti. The reference time to, which is a newly introduced unknown quantity, is a time common to all satellites. On the other hand, the differential time Ti, which is a difference between the value Tmi of the digits expressing a number equal to or greater than 1 msec and the reference time to, is a time varying from satellite to satellite.

By expressing the diffusion-code transmission time ti by using Eq. (1b), from a relation between the positions of the satellite Si as well as the receiver 1 and the time required by the diffusion code to arrive at the receiver 1, substitution of Eq. (1b) in FIG. 2 to Eq. (91) in FIG. 22B makes it possible to derive the equation expressed by Eq. (2) in FIG. 3.

Note that in Eq. (2), symbol Xi (ti) denotes a vector representing the 3-dimensional coordinates of the satellite Si at a time ti as shown by Eq. (3), symbol Xo denotes a vector representing the 3-dimensional coordinates of the receiver as shown by Eq. (4), symbol c denotes the velocity of light in a vacuum, symbol tr denotes a time at which the diffusion code is received by the receiver and symbol T denotes an error of the internal clock employed in the receiver. The time tr is a value calculated by the internal clock employed in the receiver. It is to be noted that symbol T at the right end of the expression on the right-hand side of Eqs. (3) and (4) indicates that the expression on the right-hand side of the equations is a transpose vector.

The differential time Ti in Eqs. (1b) and (2) can be found from the present time and the approximate position of the receiver, which are both already known quantities.

On the other hand, the value Tci of digits expressing a number smaller than 1 msec corresponds to the phase of the diffusion code. These digits are loworder digits of the diffusion-code transmission time ti. Thus, by receiving a diffusion code with a duration of 1 msec and confirming the phase of the diffusion code, it is possible to instantaneously find the value Tci at the activation time of the receiver. The diffusion-code reception time tr is common to all satellites and can be detected at the same time as the reception of the diffusion code by using the internal clock employed in the receiver. In the case of the embodiment shown in FIG. 1, the internal clock is the clock circuit 35.

Thus, Eq. (2) includes five unknown quantities, namely, the reference time to, the error $\tau$ of the internal clock of the receiver and the 3-dimensional coordinates xo, yo and zo of the receiver.

Therefore, in accordance with the first method of the present invention, in a condition where the approximate position of the receiver is already known, diffusion codes are received from five satellites whose information on loci has been received, and the phase of each diffusion code is confirmed. Then, the simultaneous equations of Eq. (2) are established as expressed by Eqs. (2a) to (2e) shown in FIG. 3 for five satellites Si where i=1 to 5.

Eqs. (2a) to (2e) are 5-dimensional simultaneous nonlinear equations. Physical requirements indicate that one or more sets of solutions always exist. Thus, by adopting the iteration method, solutions can be found. That is to say, the 3-dimensional coordinates xo, yo and zo of the receiver can be calculated.

<Typical Solution Based on First Method: FIGS. 4 to 7>

The following description explains a case for solving Eq. (2) for five satellites, that is, Eqs. (2a) to (2e), by adoption of Newton's method, which is a representative one of the iteration methods. In order to solve Eq. (2), it is necessary to obtain the differential time Ti in advance by execution of a method to be described later.

First of all, a linear approximation $\Delta fi$ of the function expressed by Eq. (2) at a point of interest like one indicated by Eq. (11) shown in FIG. 4 is found. An example of the linear approximation $\Delta fi$ is one indicated by Eq. (12) shown in FIG. 4. Then, values of expression (14), which satisfy Eq. (13), are found. Note that symbol $\Delta Xo$ in expression (14) denotes a vector expressed by Eq. (15) shown in the same figure. It is worth noting that symbol T at the right end of the expression on the right-hand side of Eq. (15) indicates that the expression on the right-hand side of the equation is a transpose vector. Eq. (16) is an equation explaining symbol Xo.

From only one equation, namely, Eq. (13) established for a specific satellite, the values shown in expression (14)

cannot be found univocally. From five equations set for all the five satellites by varying the values in the range 1 to 5 for i in Eq. (13), however, 5-dimensional linear simultaneous equations each expressed by Eq. (17) are obtained.

Symbols F and $\Delta P$ of Eq. (17) denotes vectors expressed by Eqs. (18) and (19) respectively. Also in this case, symbol T at the right end of the expression on the right-hand side of Eq. (18) and (19) indicates that the expression on the right-hand side of Eqs. (18) and (19) is a transpose vector. Symbol J in Eq. (17) denotes a matrix of 5 rows and 5 columns like one indicated by Eq. (21) shown in FIG. 5.

The linear simultaneous equations each expressed by Eq. (17) can be solved by Gauss elimination method. Then, by solving linear simultaneous equations each expressed by Eq. (17), the vector $\Delta P$ and the next point of interest to be described later can be found.

Elements of the matrix represented by J in Eq. (21) can be expressed by Eqs. (22) to (26) also shown in FIG. 5. A numerator in the expression of Eq. (26) is an expression of an inner product A·B as shown in FIG. (27). Symbol A·B denotes an inner product of vectors A and B. The vector B is a velocity vector representing the velocity Vi (t) of the satellite Si at a time t. The velocity vector Vi (t) can be found generally from a Doppler shift quantity.

What is described above is processing in one iteration of Newton's method. In actuality, the calculation is started from initial values shown in Eq. (31) of FIG. 6.

Xo (0)=Xoa in Eq. (31) is the receiver's approximate position, which is an already known quantity. Symbol $\tau(0)$ denotes an initial value of the error T of the internal clock employed in the receiver. Since the clock employed in the receiver is assumed not to go wrong, the initial value $\tau(0)$ can be assumed to be 0. Symbol to (0) denotes the initial value of the reference time to for the value Tmi (=Ti+to), which is the value of digits expressing a number equal to or greater than 1 msec. These digits are high-order digits of the diffusion-code transmission time ti. Symbol toa denotes an internal time of the receiver at the start point of an iterative calculation. The initial value to (0) is set at the internal time toa.

In the first iterative calculation described above, Eq. (17) shown in FIG. 4 is solved in order to find $\Delta P$. Then, the next point of interest like one indicated by Eq. (33) shown in FIG. 7 is found and the iterative calculation is repeated.

A judgment as to whether or not the solutions have converged is formed by determining whether or not $|\Delta Xo|$, $|66\ P|$ or $|F|$ has become smaller than a constant $\epsilon$ determined in advance as indicated respectively by Eq. (35), (36) or (37) shown in FIG. 7. That is to say, the solutions are determined to have converged if $|\Delta Xo|$, $|\Delta P|$ or $|F|$ has become smaller than the constant $\epsilon$.

The iterative calculation may be continued till the solutions converge. If the solutions are determined to have not converged even after the iterative calculation has been repeated a predetermined number of times, however, the solutions may be determined to never converge. In this way, the amount of calculation can be prevented from becoming to too large.

<Typical Method of Calculating Differential Time Ti: FIG. 8>

In order to solve Eq. (2) for five satellites, that is, Eqs. (2a) to (2e), it is necessary to obtain the differential time Ti in advance for all the five satellites. The following description explains a typical method to calculate the differential time Ti.

The value Tci of digits expressing a number smaller than 1 msec is given as the phase of a diffusion code and is thus an already known quantity. These digits are low-order digits of the diffusion-code transmission time ti expressed by Eq. (1b) shown n FIG. 2. On the other hand, the differential time Ti indicates how much the diffusion-code transmission time ti is shifted from the properly determined reference time to. The value of digits expressing a number smaller than 1 msec is represented only by Tci. Thus, for the differential time Ti and the reference time to, the value of the digits expressing a number smaller than 1 msec is 0.

In this case, symbol to in Eq. (1c) shown in FIG. 8 denotes the value of digits expressing a number equal to or greater than 1 msec. These digits are high-order digits of the diffusion-code transmission time t1 of the satellite S1 or the satellite Si for i=1. A value of the reference time to is selected so that T1=0. In this case, as indicated by Eq. (1d) shown in the same figure, the differential time Ti represents how much the value of the digits expressing a number equal to or greater than 1 msec (or high-order digits of the diffusion-code transmission time ti of the satellites Si where $i \geq 2$, is shifted from the value to of the digits expressing a number equal to or greater than 1 msec (or high-order digits of the diffusion-code transmission time t1 of the satellite S1).

Thus, for the satellites Si where $i \geq 2$, a relation expressed by Eq. (41) is obtained and, from the differential time Ti, it is possible to eliminate the reference time to, which is an unknown quantity.

In order to calculate the differential time Ti by using Eq. (41), the diffusion-code transmission time ti of the satellite Si is required. From Eq. (42), which expresses a relation between the positions of the satellite Si and the receiver, it is possible to derive Eq. (43) expressing the diffusion-code transmission time ti. Eq. (44) is a specific form of Eq. (43) for the satellite S1. Note that the diffusion-code reception time tr is a sum of a time measured by the internal clock employed in the receiver and the error $\tau$ of the internal clock employed in the receiver.

By substituting Eqs. (43) and (44) for respectively ti and t1 in Eq. (41), Eq. (45) is obtained, eliminating the diffusion-code reception time tr from the differential time Ti.

The differential time Ti and the reference time to each have a value expressed in terms of 1-msec units. Thus, if the differential time Ti expressed by Eq. (45) is transformed into a distance, solutions are obtained for each value expressed by Eq. (46), that is, for each distance of about 300 km.

On the other hand, the diffusion-code transmission times t1 and ti shown in Eq. (45) are each a parameter used for finding 3-dimensional coordinates of each satellite.

As disclosed in some documents such as references 1 and 2, a velocity of satellite relative to a receiver located on the ground in the direction of a visual line connecting the satellite to the receiver does not exceed 1 km per second so that the distance between the satellite and the receiver does not change by more than 1 m per msec Reference 1 is a document with a title of "Fundamentals of Global Positioning System Receivers: A Software Approach," authored by James Bao-Yen Tsui, published by John Wiley & Sons, Inc., 2,000. On the other hand, reference 2 is a document with a title of "Fundamentals of GPS Measurements," a revised edition, published by the Japanese Association of Surveyors, page 90.

Thus, even if the diffusion-code transmission times t1 and ti shown in Eq. (45) change by 1 msec, the values of the first and second terms of the right-hand expression in Eq. (45) change only by up to 1 m if the terms are each transformed into a distance.

As is obvious from the above consideration, the diffusion-code transmission times t1 and ti each shown in Eq. (45) as an unknown quantity do not have to be accurate.

In this case, as shown by Eq. (47), it is assumed that the diffusion-code transmission time ti of the satellite Si precedes the diffusion-code transmission time t1 of the satellite S1 by 20 msec. This period of 20 msec approximately corresponds to a difference in arrival time between a diffusion code transmitted by a satellite at a longest distance from the receiver on the ground and a diffusion code transmitted by a satellite at a shortest distance from the receiver.

Consider a case in which the arrival time of a diffusion code is substituted for both the diffusion-code transmission times t1 and ti of Eq. (45). In this case, the time required by the diffusion code to arrive at the receiver is 70 msec. As described above, the distance between the receiver and a satellite does not change by longer than 1 m in a period of 1 msec. Thus, if a time, which includes an error $\tau$ of the internal clock employed in the receiver and is later than the actual diffusion-code transmission time t1 by 1 second (or 1,000 msec), is substituted, the distance between the receiver and the satellite S1 changes by a difference not greater than about 1 km in 1 second. That is to say, the distance between the receiver and the satellite Si changes by a difference not greater than about 1.02 km in 1.02 seconds, which is the sum of 1 second and 20 msec described above.

Even if the varying parts of the first and second terms on the right-hand side of Eq. (45) have signs opposite to each other, the varying parts will result in only a change of about 2 km, which is the sum of 1 km and 1.02 km. Expressed in terms of time, this change is equivalent to a difference of about 6.7 microseconds. The difference is an extremely small in comparison with an interval that the differential time Ti can take as described above. If transformed into a distance, this interval is equivalent to a distance of about 300 km. By rounding off the expression on the right-hand side of Eq. (45) at the digit of 0.1 msec, that is, by counting fractions equal to or greater than 0.5 as one and discarding the rest, the difference can absorbed sufficiently.

That is to say, there will be no problems even if the diffusion-code reception time common to all satellites is used instead of the diffusion-code transmission time as a time used in calculation of the 3-dimensional coordinates of a satellite. In addition, as the diffusion-code reception time, a time, which is measured by the internal clock employed in the receiver and thus includes an error $\tau$, can be used.

Symbol Xo naturally denotes a 3-dimensional coordinate of the receiver. As the quantity Xo in Eq. (45) used for calculating a differential time Ti, however, the approximate position of the receiver, which is an already known quantity, can be used for the same reason as what has been described above.

Thus, the differential time Ti for each of the five satellites can be calculated by using Eq. (45) from the locus information of the satellites, the approximate position of the receiver, the diffusion-code reception time tr and the phase of the diffusion code, which are each an already known quantity. As described above, the phase of the diffusion code is represented by the value Tci of digits expressing a number smaller than 1 msec. These digits are low-order digits of the diffusion-code transmission time ti.

What is described above applies to a case in which the receiver is stationary. Even if the receiver is assumed to be moving at a high speed of 1,000 km per hour, the receiver will move along a distance of about 0.3 m in 1 msec or about 300 m in 1 sec. Thus, the speed of the receiver can be neglected. That is to say, the calculation method described above can be applied to a case in which the receiver is moving.

<Tolerance of Receiver Approximate Position and Tolerance of Receiver Internal Clock Error: FIGS. 9 to 11>

As indicated by Eq. (31) shown in FIG. 6, the approximate position of the receiver and the time measured by the internal clock employed in the receiver are not only required as initial values for solving Eq. (2) shown in FIG. 3, but also required for finding the differential time Ti by using Eq. (45) shown in FIG. 8 as described above.

If the approximate position of the receiver is much shifted away from the actual position of the receiver being found or if the internal clock employed in the receiver goes wrong too much, however, the relations between the position of the receiver and the positions of the satellites inevitably much change from the actual positional relations so that the differential time Ti found by using Eq. (45) is different from the actual transmission time of the diffusion code.

In order to solve the problem described above, first of all, it is necessary consider a tolerance as to how much the approximate position of the receiver is shifted away from the actual position of the receiver.

Both sides of Eq. (45) shown in FIG. 8 are multiplied by c in order to transform the unit from a time unit into a distance unit as indicated by Eq. (51) shown in FIG. 9.

In order to shift the differential time Ti by 1 msec, which is its smallest unit, it is necessary to change the value cTi shown in Eq. (51) by about 300 km. In order to produce the correct value of the differential time Ti, it is necessary to limit the shift of the value cTi relative to the correct value of the differential time Ti within a range of about ±150 km or, if transformed into time, a range of about ±0.5 msec.

Since the approximate position of the receiver is substituted for Xo in Eq. (51), first of all, consider a case in which Xo changes. If Xo changes to Xo+$\Delta$x, the distance between the satellite S1 and the receiver in the first term of the expression on the right-hand side of Eq. (51) and the distance between the satellite Si and the receiver in the second term of the expression on the right-hand side of Eq. (51) change.

As the most extreme case, consider a case in the distance between the satellite S1 and the receiver and the distance between the satellite Si and the receiver change by $|\Delta x|$ in the directions of visual lines connecting the receiver to the satellites S1 and Si. In such a case, if it is assumed that the distance between the satellite S1 and the receiver in the first term of the expression on the right-hand side of Eq. (51) increases while the distance between the satellite Si and the receiver in the second term of the expression on the right-hand side of Eq. (51) decreases so that the difference in change between the distance from the satellite S1 to the receiver in the first term of the expression on the right-hand side of Eq. (51) and the distance from the satellite Si to the receiver in the second term of the expression on the right-hand side of Eq. (51) rises, Eq. (51) is changed to Eq. (52).

In this change from Eq. (51) to Eq. (52), the following vector property is utilized. If two vectors A and B satisfy a relation expressed by Eq. (63) shown in FIG. 9, a relation expressed by Eq. (64) holds true. In addition, since the relation expressed by Eq. (65) holds true in Eq. (52), the vectors A and B are determined by Eqs. (66) and (67) respectively to convert Eq. (64) into Eq. (68).

That is to say, even if it is assumed that Xo changes to (Xo+$\Delta$X) in both the first and second terms of the expression on the right-hand side of Eq. (51), as described above, the distance in the first term increases (to result in the right-hand side of an inequality expressed by Eq. 68) while the distance in the second term decreases (to result in the left-hand side of the inequality expressed by Eq. 68).

In addition, if 2 $|\Delta X|$ does not exceed about 150 km, that is, if the movement distance $|\Delta X|$ of Xo does not exceed about 75 km, from Eq. (52), the correct value of the differential time Ti can be found.

Note, however, that the above description applies to an ideal case of the times t1 and ti used for calculating 3-dimensional coordinates of a satellite. For this reason, the approximate position of the receiver is assumed to be correct. With such an assumption, consider a tolerance of shifts of the times t1 and ti used for calculating 3-dimensional coordinates of a satellite or a tolerance of the error $\tau$ of the internal clock employed in the receiver.

As described above, a velocity of satellite relative to the receiver in the direction of a visual line connecting the receiver to the satellite does not exceed 1 km per second even if the velocity reaches a maximum value so that the distance between the satellite and the receiver does not change by a difference greater than 1 m in 1 msec.

In this case, as indicated by Eq. (47) shown in FIG. 8, it is assumed that the diffusion-code transmission time ti of the satellite Si precedes the diffusion-code transmission time t1 of the satellite S1 by 20 msec. This period of 20 msec approximately corresponds to a difference in arrival time between a diffusion code transmitted by a satellite at a longest distance from the receiver on the ground and a diffusion code transmitted by a satellite at a shortest distance from the receiver. In addition, it is also assumed that the distance between the satellite and the receiver changes by a difference of 1 m in 1 msec.

If (t1+$\Delta t$) (where $\Delta t \geq 0$) is used as a time for finding 3-dimensional coordinates of the satellites S1 and Si, from Eq. (47) shown in FIG. 8, this (t1+$\Delta t$) is expressed by Eq. (53) shown in FIG. 10. Thus, the expression on the right-hand side of Eq. (51) shown in FIG. 9 is converted into an expression expressed by Eq. (54) shown in FIG. 10.

However, with respect to Eq. (54), as the most extreme case, consider a case in which changes in satellite coordinates are equal to a change in distance in the direction of a visual line connecting the receiver to the satellite. In addition, assume that the satellite S1 moves in a direction leaving the receiver while the satellite Si moves in a direction approaching the receiver so that the difference between the first and second terms of the expression on the left-hand side increases.

If $\Delta d$ expressed by Eq. (55) does not exceed about 150 km, that is, if $\Delta t$ is not greater than about 75 seconds, the correct value of the differential time Ti can be found from Eq. (54).

In actuality, the effect of Eq. (52) shown in FIG. 9 and the effect of Eq. (54) shown in FIG. 10 appear at the same time. Thus, if the precision of the approximate position of the receiver and the precision of the internal clock employed in the receiver are assumed to be both most effective, the correct value of the differential time Ti can be found provided that the condition of relation (56) shown in FIG. 11 is satisfied, that is, provided that the distance expressed by the expression on the left-hand side of relation (56) is shorter than 150 km. If both the sides of relation (56) are divided by 2, relation (57) is obtained. In this relation, $\Delta t$ may have a negative value.

In this case, as described earlier by referring to FIG. 9, symbol $|\Delta X|$ denotes a distance between coordinates representing the approximate position of the receiver and the actual position of the receiver. On the other hand, symbol $\Delta t$ denotes a shift from the diffusion-code transmission time of the satellite. Variations in diffusion-code transmission time from satellite to satellite, which have a maximum value of about 20 msec, and the time required for a diffusion code transmitted by a satellite to arrive at the receiver, which has a maximum value of about 90 msec, are sufficiently small enough in comparison with the order of Eq. (57) and can thus be neglected.

In addition, as described above, by using the time indicated by the internal clock of the receiver at the calculating execution point as a time used for calculating the 3-dimensional coordinates of the satellite, the shift $\Delta t$ can be considered to be an error of the internal clock employed in the receiver.

<Effects>

In accordance with the first method described above, even in a condition where a TOW (Time of Week) included in the latest information on loci cannot be obtained such as a condition immediately following activation of the receiver, the coordinates of the receiver can be calculated without waiting for the TOW to be confirmed provided that the information on loci of the satellites, the approximate position of the receiver and the present time have been obtained. As a result, the time to the first positioning at a hot start can be shortened substantially. The time to the first positioning is referred to as the TTFF (Time To First Fix).

In addition, even if an epoch of a 1 msec-unit cannot be obtained under a condition where a signal transmitted by a satellite is weak so that information on a locus cannot be demodulated in spite of the fact that the phase of the diffusion code has been obtained, the coordinates of the receiver can be calculated in the same way provided that the information on loci of the satellites, the approximate position of the receiver and the present time have been obtained. As a result, the improvement of the positioning rate can be realized.

Furthermore, if the positioning calculation process is carried out only at a request made by the user in order to reduce the power consumption, in accordance with the conventional method, it is necessary to confirm the TOW after the user makes a request for a positioning calculation but before the coordinates of the receiver are known. In accordance with the first method provided by the present invention, on the other hand, the coordinates of the receiver can be calculated without waiting for the TOW to be confirmed so that the operating period of the receiver can-be shortened. As a result, the power consumption can be reduced.

(Positioning Calculation Based on Second Method: FIG. 12)

In the first method, 5-dimensional simultaneous equations are established for five satellites Si where i=1 to 5. The 5-dimensional simultaneous equations are Eqs. (2a) to (2e) shown in FIG. 3. As shown in FIG. 3, the 5-dimensional simultaneous equations expressed by Eq. (2) include five unknown quantities, namely, the reference time to, the error $\tau$ of the internal clock employed in the receiver, and the 3-dimensional coordinates xo, yo and zo of the receiver. The 5-dimensional simultaneous equations are solved by typically adopting an iteration method in order to calculate the 3-dimensional coordinates xo, yo and zo of the receiver.

In accordance with a second method provided by the present invention, on the other hand, in a state where the approximate position of the receiver is already known, diffusion codes are received from at least 6 satellites whose information on loci has been received. Then, the phase of the diffusion code is confirmed. Subsequently, simultaneous equations each expressed by Eq. (2) shown in FIG. 3 for at least 6 satellites, for example, 6 simultaneous equations expressed by Eqs. (2a) to (2f) shown in FIG. 12 for the 6 satellites Si, where i=1 to 6, are established.

Also in this case, there are five unknown quantities, namely, the reference time to, the error τ of the internal clock employed in the receiver, and the 3-dimensional coordinates xo, yo and zo of the receiver. Since Eqs. (2a) to (2f) form 5-dimensional nonlinear simultaneous equations, from physical requirements, one or more sets of solutions always exist. Thus, by adopting the same calculation technique as the first method, the 3-dimensional coordinates xo, yo and zo of the receiver can be calculated.

It is to be noted, however, that in this case, the number of satellites used in the calculation is 6 or greater. Let symbol m denotes the number of satellites used in the calculation. Thus, the relation m≧6 holds true. Assume that 6 satellites are used. In this case, a vector F appearing in Eq. (17) shown in FIG. 4 is an m-row vector and a matrix J appearing in Eq. (17) is a matrix having mn rows and 5 columns unlike the matrix having 5 rows and 5 columns appearing in Eq. (21) shown in FIG. 5.

However, even if the sizes of the vector F and the matrix J change, Eq. (17) expresses 5-dimensional linear simultaneous equations as is the case with only five satellites used in the calculation. In this case, a solution can be found by adopting the method of least squares. A solution ΔP is expressed by Eq. (61) shown in FIG. 12. Note that symbol −1 on the right-hand side of the equation indicates that the factor on the right-hand side of the equation is an inverse matrix.

The method of calculating a differential time Ti, the tolerance of the approximate position of the receiver and the tolerance of the error generated by the internal clock employed in the receiver are the same as the first method.

In the case of the solution based on 4 satellites in accordance with the conventional method and the solution based on five satellites in accordance with the first method, the phase of the diffusion code and the 3-dimensional coordinates of each satellite include errors attributed to a variety of causes. As indicated by Eqs. (91a) to (91d) shown in FIG. 22B for the case of the solution based on 4 satellites in accordance with the conventional method and Eqs. (2a) to (2e) shown in FIG. 3 for the case of the solution based on five satellites in accordance with the first method, as many simultaneous equations as unknown quantities are established in order to find solutions. Nevertheless, it is impossible to find solutions that strictly satisfy the simultaneous equations.

In order to solve this problem, the number of satellites used in the calculation is increased, allowing the number of simultaneous equations to be raised as is the case with the second method. By increasing the number of simultaneous equations, conditions restricting solutions to the simultaneous equations can be made stricter. In this way, while the amount of calculation rises in comparison with the first method, in general, the precision of the solutions is made better than the first method. In addition to the improved precision, the second method has the same effects as the first method.

(Positioning Calculation Based on Third Method: FIG. 13)

In accordance with the first or second method described above, for five or six or more satellites, the phase of the diffusion code can be confirmed and it is necessary to establish simultaneous equations expressed by Eq. (2).

For the reason described above, in spite of the fact that a position has been measured till an immediately preceding time, an electric wave transmitted by a certain satellite becomes weak temporally due to the landform and/or constructions. In addition, due to a satellite being shielded by an obstruction, the number of satellites, the diffusion-code phases of which are to be obtained, may become 4. In this case, the first and second methods cannot be used anymore.

If the receiver is moving along with a car or being carried by a pedestrian, however, data, which is height above sea level and obtained as a result of an immediately preceding positioning, can be regarded as fixed data or invariable data during a short period of time without causing any problems.

In accordance with a third method provided by the present invention, simultaneous equations each expressed by Eq. (2) shown in FIG. 3 are established for 4 satellites, the diffusion-code phase of which has been confirmed as expressed by Eqs. (2a) to (2d) shown in FIG. 3 or FIG. 12. In addition, the earth is assumed to be truly spherical so that a statement saying that height above sea level is fixed can be interpreted as a statement saying that a distance from the coordinate origin, which is the center of the earth, is fixed. Then, Eq. (71) shown in FIG. 13 is established.

Symbol Xoa used in Eq. (71) denotes the receiver's approximate position, which is an already known quantity obtained as a result of typically an immediately preceding positioning. Eq. (71) indicates that a virtual fifth satellite exists at the earth center used as the coordinate origin and the distance |Xo| from the satellite to the receiver is equal to the distance Xoa, which is an already known quantity.

To put it in detail, in accordance with the third method, even though there are only 4 real satellites, the method establishes 5-dimensional non-linear simultaneous equations as if there were five satellites. A function f5 established for the fifth satellite among the 5-dimensional non-linear simultaneous equations is expressed by Eq. (71). Thus, by replacing the fifth row of the matrix in Eq. (21) shown in FIG. 5 with Eqs. (72) to (76) shown in FIG. 13, the equations can be solved by adoption of the same solution technique as the first method.

The third method also provides the same effects as the first and second methods.

(Routines of Positioning Processing: FIGS. 14 to 18)

The first to third methods described above are each a positioning calculation method adopted in a condition where the diffusion-code transmission time ti has not been confirmed like a condition immediately following activation of the receiver. After the lapse of a predetermined time since the activation of the receiver, however, the diffusion-code transmission time ti may be confirmed. In this case, the reference time to appearing in Eq. 2 shown in FIG. 3 is not an unknown quantity anymore. Thus, it is possible to establish simultaneous equations, which each include the 3-dimensional coordinates xo, yo and zo of the receiver and the error of the internal clock employed in the receiver as expressed by Eq. (91) shown in FIG. 22B, as Eqs. (91a) to (91d) for at least 4 satellites. By solving the simultaneous equations, the 3-dimensional coordinates xo, yo and zo of the receiver can be found.

In addition, an electric wave transmitted by a certain satellite becomes weak generally due to the shape of the ground and/or constructions. In addition, due to a satellite being shielded by an obstruction, the number of satellites, the diffusion-code transmission times of which are to be obtained, may become 3. In this case, it is possible to establish simultaneous equations as Eqs. (91a) to (91c) for the 3 satellites, the diffusion-code transmission times of which have been confirmed. In addition, the earth is assumed to be truly spherical so that a condition requiring that height above sea level be fixed can be interpreted as a condition requiring that a distance from the coordinate origin, which is the center of the earth, be fixed. Then, Eq. (95) shown in FIG. 22B is established in the same way as Eq.

(71) shown in FIG. 13 of the third method described above. Finally, by solving the simultaneous equations expressed by Eqs. (91a) to (91c) and Eq. (95), the 3-dimensional coordinates xo, yo and zo of the receiver can be found.

Symbol Xoa used in Eq. (95) denotes the approximate position of the receiver, which is an already known quantity. Typically, the approximate position Xoa is obtained as a result of the immediately preceding positioning process. Eq. (95) indicates that a virtual fourth satellite exists at the earth center used as the coordinate origin and the distance |Xo| from the satellite to the receiver is equal to the distance Xoa, which is an already known quantity.

Figure 14:
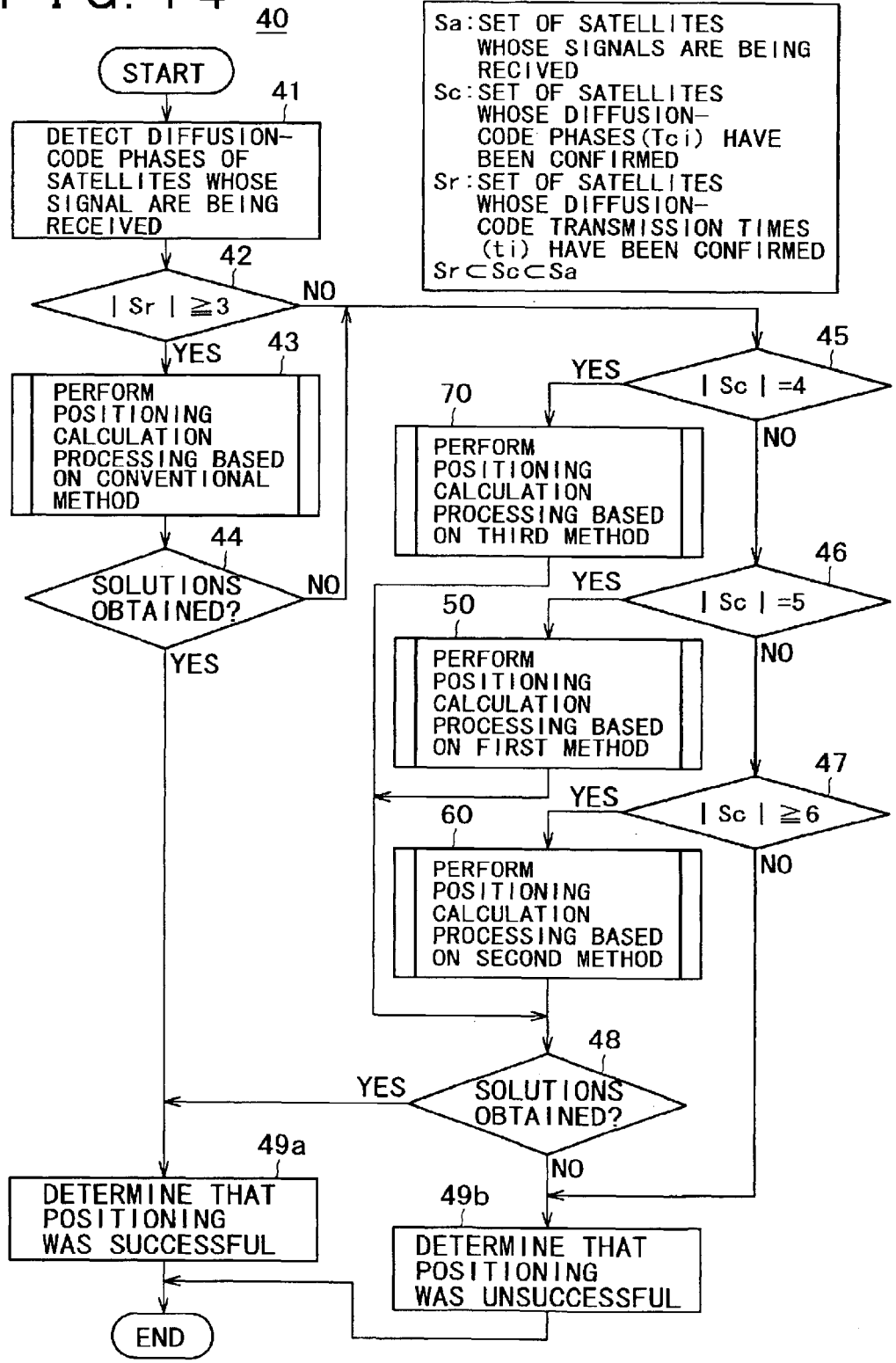
FIG. 14 shows a flowchart representing a typical routine of an entire positioning process.

<Whole Positioning Processing: FIG. 14>

FIG. 14 shows a flowchart representing a typical routine 40 to be executed by a CPU 31, which is employed in the receiver implemented by the embodiment shown in FIG. 1, to carry out the entire positioning processing by adoption of the conventional method in addition to the first, second and third methods.

This routine 40 begins with a step 41 to detect the phase of a diffusion code transmitted by each of satellites, the signals of which are being received by the receiver, for each positioning process. At that time, if the diffusion-code transmission time ti can be detected, the diffusion-code transmission time ti is also detected.

Let symbol Sa denote a set of satellites, the signals of which are being received, symbol Sc denote a set of satellites, the diffusion-code phases Tci of which have been confirmed and symbol Sr denote a set of satellites, the diffusion-code transmission times ti of which have been confirmed. In this case, the relation $Sr \subset Sc \subset Sa$ holds true. As described earlier, symbol Tci denotes the value of digits expressing a number smaller than 1 msec. These digits are low-order digits of the diffusion-code transmission time ti.

Then, the flow of the routine 40 goes on to the next step 42 to form a judgment as to whether or not the number of satellites included in the set Sr consisting of satellites, the diffusion-code transmission times ti of which have been confirmed, is at least 3. If the number of satellites is at least 3, the flow of the routine 40 goes on to a step 43 at which the routine 43 of the positioning calculation processing based on the conventional method is executed.

If the number of satellites included in the set Sr consisting of satellites, the diffusion-code transmission times ti of which have been confirmed, is at least 4, the routine 43 of the positioning calculation processing based on the conventional method is executed in order to calculate the 3-dimensional coordinates of the receiver by solving the simultaneous equations expressed by at least Eqs. (91a) to (91d) shown in FIG. 22B. If the number of satellites included in the set Sr consisting of satellites, the diffusion-code transmission times ti of which have been confirmed, is 3, on the other hand, the routine 43 of the positioning calculation processing based on the conventional method is executed in order to calculate the 3-dimensional coordinates of the receiver by solving the simultaneous equations expressed by Eqs. (91a) to (91c) and (95) shown in FIG. 22B.

After the routine 43 of the positioning calculation processing based on the conventional method is executed, the flow of the routine 40 goes on to a step 44 to form a judgment as to whether or not solutions have been found. If solutions have been found, the flow of the routine 40 goes on to a step 49a at which the positioning calculation process is determined to be successful. In this case, the position of the receiver obtained as a result of the positioning calculation process is displayed and one positioning calculation process is ended. If no solutions have been found, on the other hand, the flow of the routine 40 goes on from the step 44 to a step 45.

If the outcome of the judgment formed at the step 42 indicates that the number of satellites included in the set Sr consisting of satellites, the diffusion-code transmission times ti of which have been confirmed, is 2 or smaller, on the other hand, the flow of the routine 40 goes on to the step 45.

At the step 45, the number of satellites included in the set Sc consisting of satellites, the diffusion-code phase of which has been confirmed, is examined to form a judgment as to whether or not the number of satellites is equal to 4. If the number of satellites is not equal to 4, the flow of the routine 40 goes on to a step 46 to form a judgment as to whether or not the number of satellites included in the set Sc consisting of satellites, the diffusion-code phase of which has been confirmed, is equal to five. If the number of satellites is not equal to five, the flow of the routine 40 goes on to a step 47 to form a judgment as to whether or not the number of satellites included in the Sc consisting of satellites, the diffusion-code phase of which has been confirmed, is at least 6.

If the outcome of the judgment formed at the step 46 indicates that the number of satellites included in the set Sc consisting of satellites, the diffusion-code phase of which has been confirmed, is equal to five, on the other hand, the flow of the routine 40 goes on to a step 50 to execute a routine 50. As will be described later, the routine 50 represents the positioning calculation process based on the first method. If the outcome of the judgment formed at the step 47 indicates that the number of satellites included in the set Sc consisting of satellites, the diffusion-code phase of which has been confirmed, is at least 6, on the other hand, the flow of the routine 40 goes on to a step 60 to execute a routine 60. As will be described later, the routine 60 represents the positioning calculation process based on the second method. If the outcome of the judgment formed at the step 45 indicates that the number of satellites included in the set Sc consisting of satellites, the diffusion-code phase of which has been confirmed, is equal to 4, on the other hand, the flow of the routine 40 goes on to a step 70 to execute a routine 70. As will be described later, the routine 70 represents the positioning calculation process based on the third method.

After the routine 50, 60 or 70 is executed to carry out a positioning calculation process, the flow of the routine 40 goes on to a step 48 to form a judgment as to whether or not solutions have been obtained. If solutions have been obtained, the flow of the routine 40 goes on to a step 49a at which the positioning calculation process is determined to be successful. In this case, the position of the receiver obtained as a result of the positioning calculation process is displayed and one positioning calculation process is ended. If no solutions have been found, on the other hand, the flow of the routine 40 goes on to a step 49b at which the positioning calculation process is determined to have ended in a failure and one positioning calculation process is completed.

If the outcome of the judgment formed at the step 47 indicates that the number of satellites included in the set Sc consisting of satellites, the diffusion-code phase of which has been confirmed, is smaller than 6, that is, the number of satellites included in the set Sc is equal to or smaller than 3, on the other hand, the flow of the routine 40 goes on to a step 49b at which the positioning calculation process is determined to have ended in a failure and one positioning calculation process is completed.

It is to be noted that, even if the number of satellites included in the set Sc consisting of satellites, the diffusion-code phase of which has been confirmed, is equal to or greater than 6, five satellites may be selected from them to be used in a positioning calculation process based on the first method.

Figure 15:
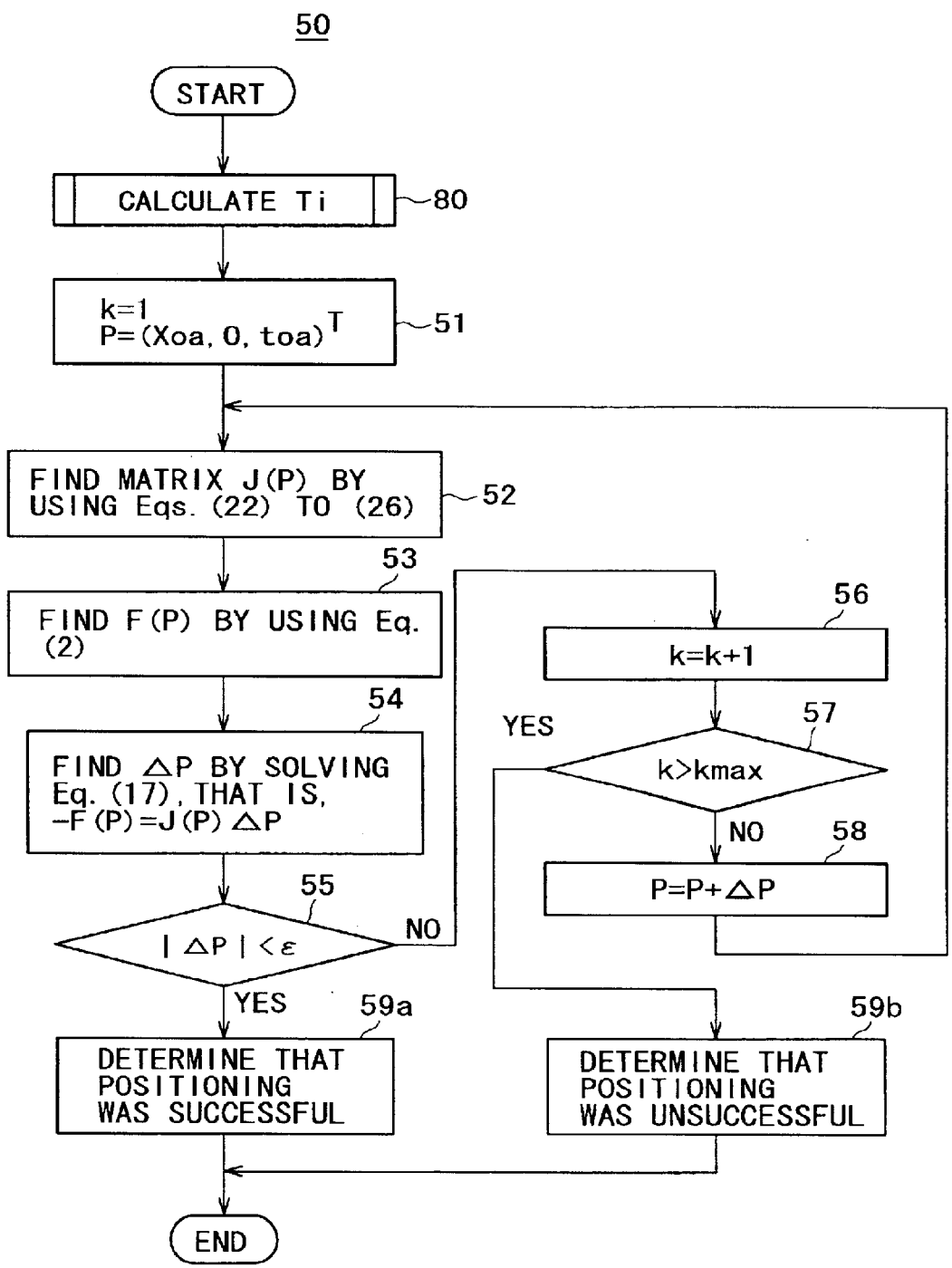
FIG. 15 shows a flowchart representing a typical routine of a positioning process based on the first method.

<Positioning calculation Process Based on First Method: FIG. 15>

FIG. 15 shows a flowchart representing a typical routine 50 of a positioning calculation process based on the first method.

The routine 50 begins with a step 80 at which a routine 80 is executed to carry out a process of calculating a differential time Ti as will be described later. Then, at the next step 51, an iterative-calculation count k (iteration order) of the iteration method is set at 1. In addition, a vector P is set at the initial value of the expression on the right-hand side of Eq. (31) shown in FIG. 6. Subsequently, at the next step 52, a matrix J expressed by Eq. (21) shown in FIG. 5 is found by solving Eqs. (22) to (26) shown in the same figure.

Then, at the next step 53, a vector F expressed by Eq. (17) shown in FIG. 4 is found by solving Eq. (2), that is, Eqs. (2a) to (2e) shown in FIG. 3. Subsequently, at the next step 54, $\Delta P$ is found by solving Eq. (17).

Then, at the next step 55, a convergence condition expressed by relation (36) shown in FIG. 7 is examined to form a judgment as to whether or not the condition is satisfied. If the convergence condition is satisfied, the flow of the routine 50 goes on to a step 59a at which the positioning calculation process is determined to be successful and the positioning calculation process is ended.

If the outcome of the judgment formed at the step 55 indicates that the convergence condition expressed by relation (36) is not satisfied, on the other hand, the flow of the routine 50 goes on to a step 56 at which the iterative-calculation count k is incremented by 1. Then, the flow of the routine 50 goes on to a step 57 to form a judgment as to whether or not the incremented iterative-calculation count k is greater than an upper limit kmax. If the incremented iterative-calculation count k is not greater than the upper limit kmax, the flow of the routine 50 goes on to a step 58 at which $\Delta P$ found at the step 54 is added to an immediately previous vector P to produce a new vector P to be used hereafter. Then, the flow of the routine 50 goes back to the step 52 to repeat the processes carried out at the step 52 and the subsequent steps.

If the outcome of the judgment formed at the step 57 indicates that the incremented iterative-calculation count k is greater than the upper limit kmax, on the other hand, the flow of the routine 50 goes on to a step 59b at which the positioning calculation process is determined to have ended in a failure and the positioning calculation process is completed.

As described above, the number of times the iterative calculation is carried out is limited and if the solutions do not converge in a predetermined number of iterative calculations, the solutions are determined to never converge. In this way, the amount of calculation can be prevented from becoming excessively large. In addition, it is possible to prevent the positioning calculation process from entering an endless loop in case the iterative calculation enters a state of divergence.

Figure 16:
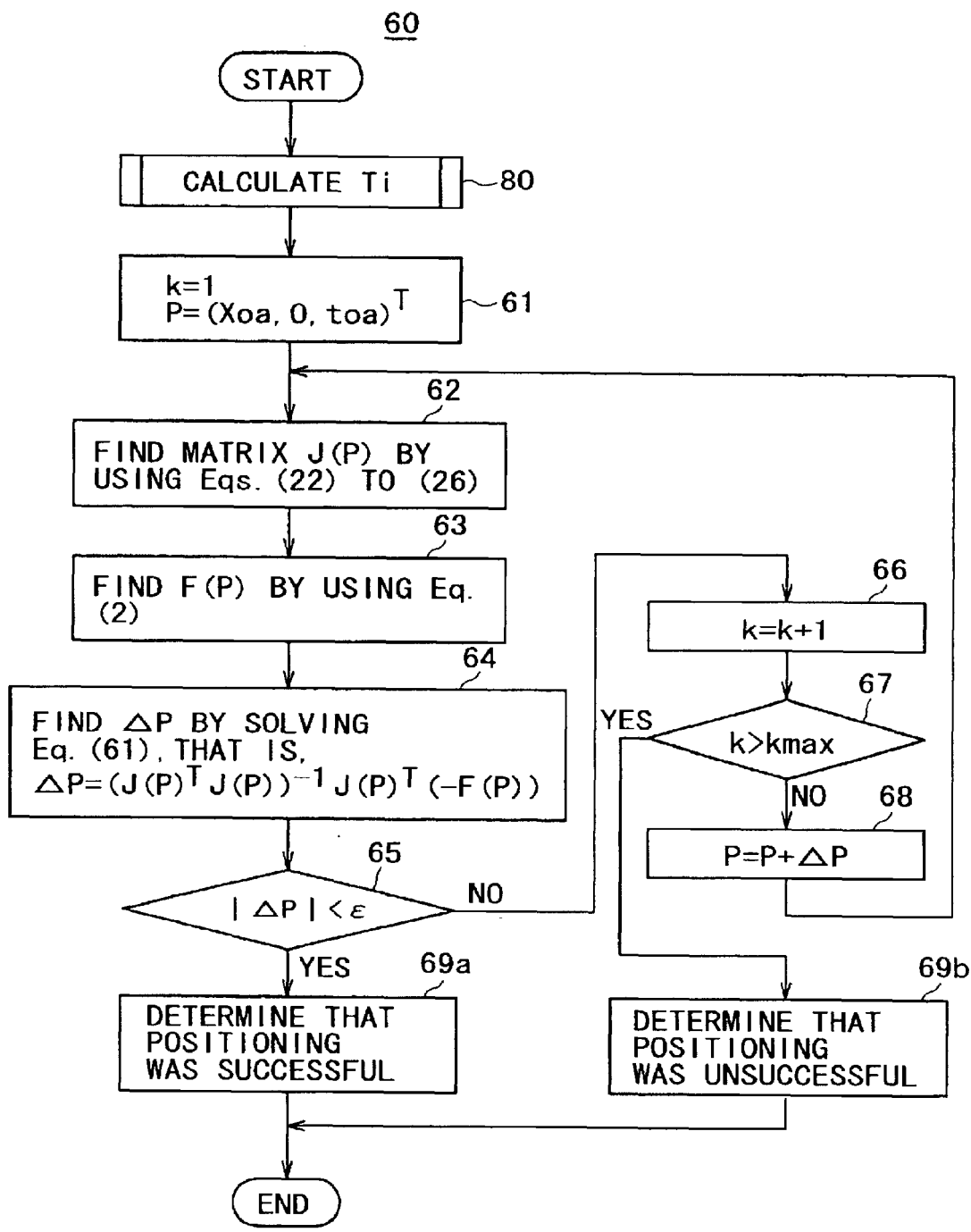
FIG. 16 shows a flowchart representing a typical routine of a positioning process based on the second method.

<Positioning calculation Process Based on Second Method: FIG. 16>

FIG. 16 shows a flowchart representing a typical routine 60 of a positioning calculation process based on the second method.

The routine 60 begins with a step 80 at which the routine 80 is executed to carry out a process of calculating a differential time Ti as will be described later. Then, at the next step 61, an iterative-calculation count k (iteration order) of the iteration method is set at 1. In addition, a vector P is set at the initial value of the expression on the right-hand side of Eq. (31) shown in FIG. 6. Subsequently, at the next step 62, a matrix J is found by solving Eqs. (22) to (26) shown in FIG. 5. In this case, the matrix J is not a matrix having 5 rows and 5 columns as expressed by Eq. (21) shown in FIG. 5, but a matrix having m rows and 5 columns.

Then, at the next step 63, a vector F expressed by Eq. (17) shown in FIG. 4 is found by solving Eq. 2 shown in FIG. 3, that is, at least Eqs. (2a) to (2f) in this case. In this case, the vector F is a vector with m rows. Subsequently, at the next step 64, $\Delta P$ is found by solving Eq. (61) shown in FIG. 12.

Then, at the next step 65, a convergence condition expressed by relation (36) shown in FIG. 7 is examined to form a judgment as to whether or not the condition is satisfied. If the convergence condition is satisfied, the flow of the routine 60 goes on to a step 69a at which the positioning calculation process is determined to be successful and the positioning calculation process is ended.

If the outcome of the judgment formed at the step 65 indicates that the convergence condition expressed by relation (36) is not satisfied, on the other hand, the flow of the routine 60 goes on to a step 66 at which the iterative-calculation count k is incremented by 1. Then, the flow of the routine 60 goes on to a step 67 to form a judgment as to whether or not the incremented iterative-calculation count k is greater than an upper limit kmax. If the incremented iterative-calculation count k is not greater than the upper limit kmax, the flow of the routine 60 goes on to a step 68 at which $\Delta P$ found at the step 64 is added to an immediately previous vector P to produce a new vector P to be used hereafter. Then, the flow of the routine 60 goes back to the step 62 to repeat the processes carried out at the step 62 and the subsequent steps.

If the outcome of the judgment formed at the step 67 indicates that the incremented iterative-calculation count k is greater than the upper limit kmax, on the other hand, the flow of the routine 60 goes on to a step 69b at which the positioning calculation process is determined to have ended in a failure and the positioning calculation process is completed.

Also in this case, as described above, if the solutions do not converge in a predetermined number of iterative calculations, the solutions are determined to never converge. In this way, the amount of calculation can be prevented from becoming excessively large. In addition, it is possible to prevent the positioning calculation process from entering an endless loop in case the iterative calculation enters a state of divergence.

Figure 17:
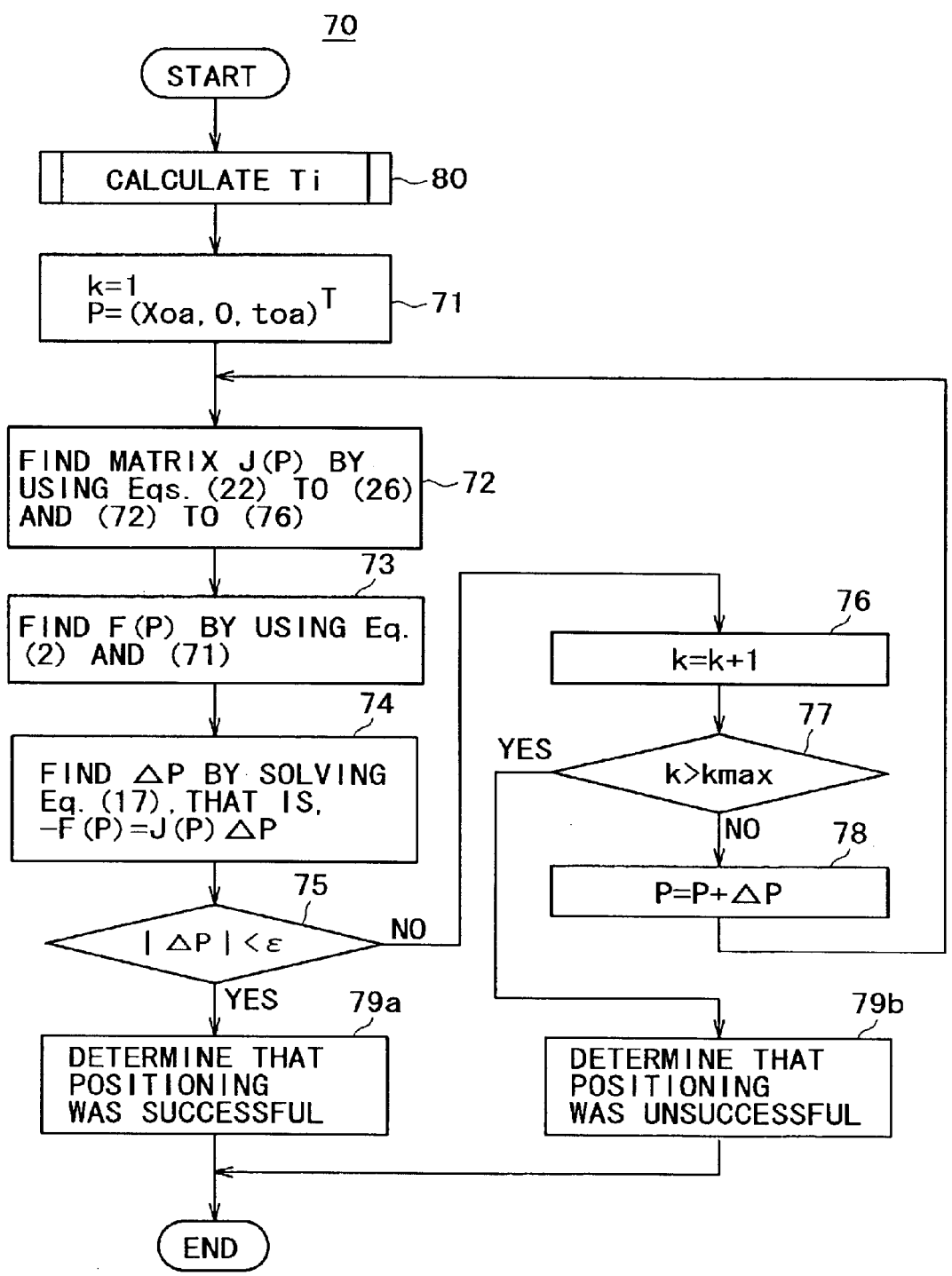
FIG. 17 shows a flowchart representing a typical routine of a positioning process based on the third method.

<Positioning Calculation Process Based on Third Method: FIG. 17>

FIG. 17 shows a flowchart representing a typical routine 70 of a positioning calculation process based on the third method.

The routine 70 begins with a step 80 at which the routine 80 is executed to carry out a process of calculating a differential time Ti as will be described later. Then, at the next step 71, an iterative-calculation count k (iteration order) of the iteration method is set at 1. In addition, a vector P is set at the initial value of the expression on the right-hand side of Eq. (31) shown in FIG. 6. Subsequently, at the next step 72, a matrix J is found by solving Eqs. (22) to (26) shown in FIG. 5 and Eq. (72) to (76) shown in FIG. 13. In this case, the matrix J is also a matrix having 5 rows and 5 columns. This matrix J is a matrix with a format obtained by replacing the fifth row of the matrix expressed by Eq. (21) shown in FIG. 5 with the expressions of Eqs. (72) to (76) shown in FIG. 13.

Then, at the next step 73, a vector F expressed by Eq. (17) shown in FIG. 4 is found by solving Eq. 2 shown in FIG. 3, that is, Eqs. (2a) to (2d) in this case, and Eq. (71) shown in FIG. 13. Subsequently, at the next step 74, $\Delta P$ is found by solving Eq. (17).

Then, at the next step 75, a convergence condition expressed by relation (36) shown in FIG. 7 is examined to form a judgment as to whether or not the condition is satisfied. If the convergence condition is satisfied, the flow of the routine 70 goes on to a step 79$a$ at which the positioning calculation process is determined to be successful and the positioning calculation process is ended.

If the outcome of the judgment formed at the step 75 indicates that the convergence condition expressed by relation (36) is not satisfied, on the other hand, the flow of the routine 70 goes on to a step 76 at which the iterative-calculation count k is incremented by 1. Then, the flow of the routine 70 goes on to a step 77 to form a judgment as to whether or not the incremented iterative-calculation count k is greater than an upper limit kmax. If the incremented iterative-calculation count k is not greater than the upper limit kmax, the flow of the routine 70 goes on to a step 78 at which $\Delta P$ found at the step 74 is added to an immediately previous vector P to produce a new vector P to be used hereafter. Then, the flow of the routine 70 goes back to the step 72 to repeat the processes carried out at the step 72 and the subsequent steps.

If the outcome of the judgment formed at the step 77 indicates that the incremented iterative-calculation count k is greater than the upper limit kmax, on the other hand, the flow of the routine 70 goes on to a step 79$b$ at which the positioning calculation process is determined to have ended in a failure and the positioning calculation process is completed.

Also in this case, as described above, if the solutions do not converge in a predetermined number of iterative calculations, the solutions are determined to never converge. In this way, the amount of calculation can be prevented from becoming excessively large. In addition, it is possible to prevent the positioning calculation process from entering an endless loop in case the iterative calculation enters a state of divergence.

Figure 18:
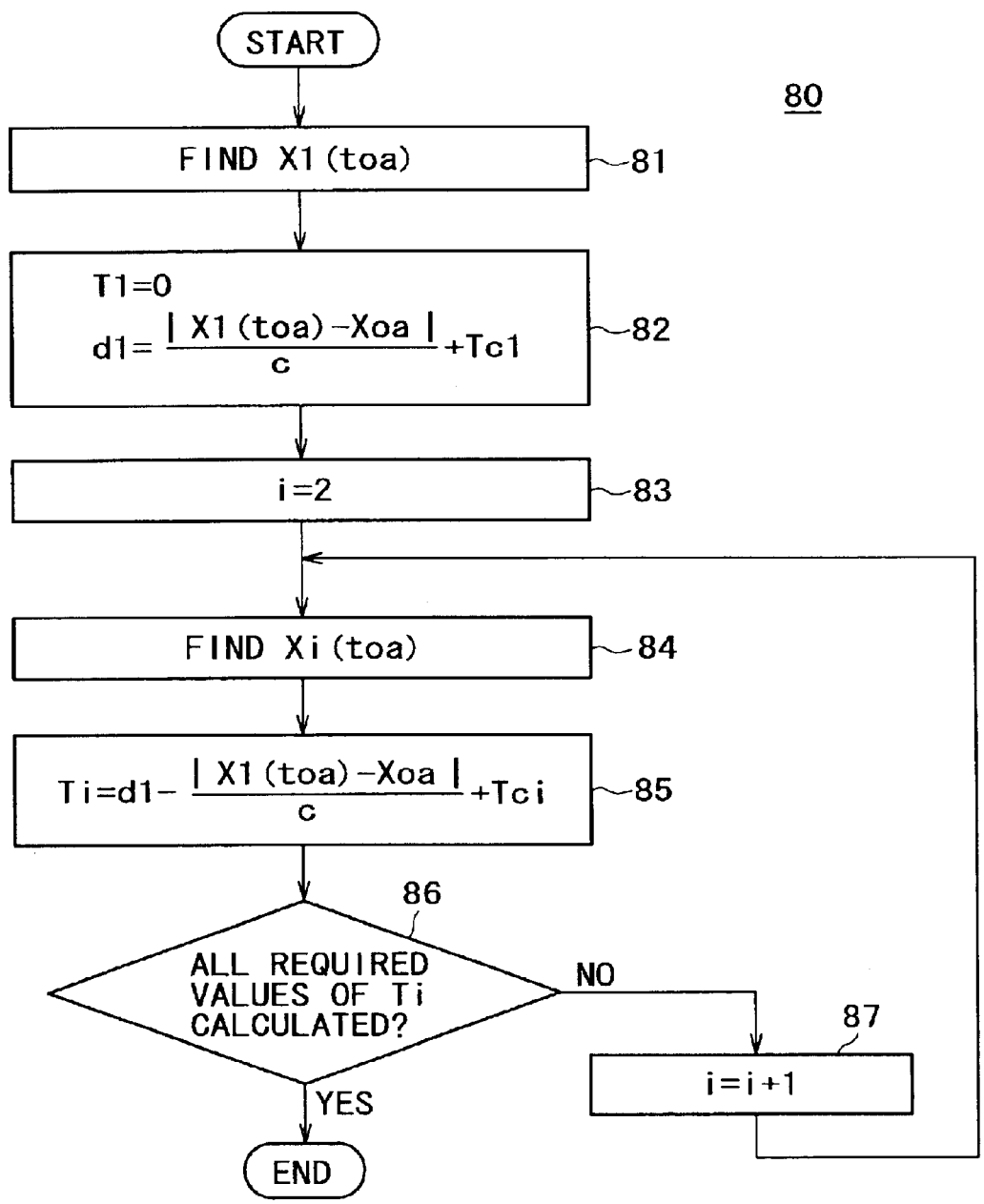
FIG. 18 shows a flowchart representing a typical routine of a process to calculate differential times.

<Process to Calculate Differential Times Ti: FIG. 18>

FIG. 18 shows a flowchart representing a routine 80 of the process to calculate differential times Ti as a part of the routines 50, 60 and 70, which are shown in FIGS. 15, 16 and 17 respectively.

The routine 80 begins with a step 81 at which the position X1 of the satellite S1 at a time toa is found. The time toa is the initial value of the reference time to shown in FIG. 6. The time toa is a time indicated by the internal clock of the receiver at a point of time to start the iterative calculation. Then, at the next step 82, as described above, T1 is set at 0 (T1=0) and a value d1 corresponding to the first term of the expression on the right-hand side of Eq. (45) shown in FIG. 8 is found.

Subsequently, at the next step 83, the number i of the satellite contributing to the calculation is set at 2. Then, at the next step 84, the position Xi of the satellite Si at the time toa described above is found. Subsequently, at the next step 85, the differential time Ti for the satellite Si is found. The differential Ti is expressed by Eq. (45) shown in FIG. 8.

Then, at the next step 86, data of the differential time Ti is examined to form a judgment as to whether or not all required differential times Ti have been calculated. If all required differential times Ti have not been calculated, the flow of the routine 80 goes on to a step 87 at which the number i of the satellite contributing to the calculation is incremented by 1. Then, the flow of the routine 80 goes back to the step 84 to repeat the processes carried out at the step 84 and the subsequent steps. As the outcome of the judgment formed at the step 86 indicates that all required differential times Ti have been calculated, the process to calculate the differential times Ti is ended.

Figure 19:
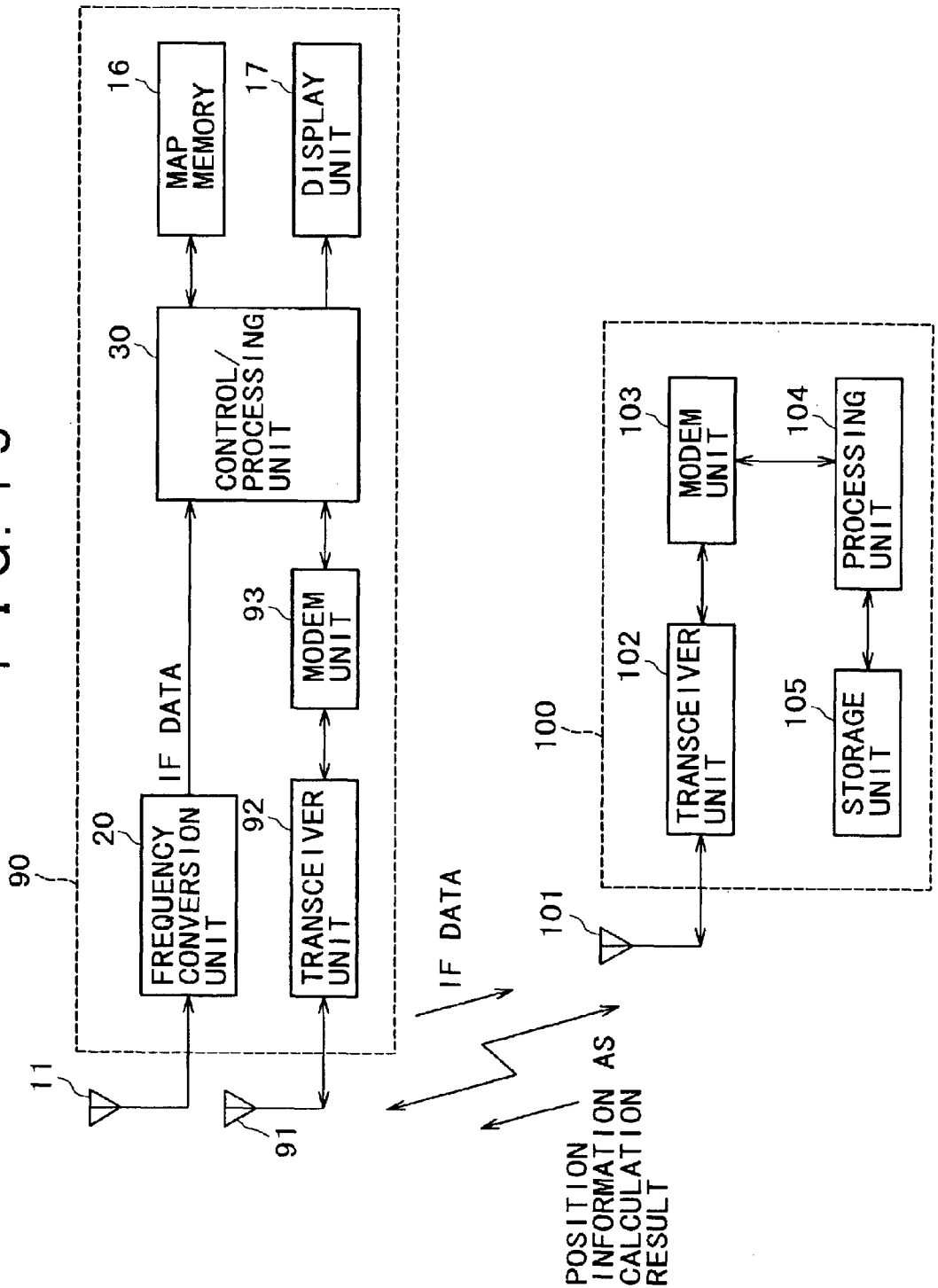
FIG. 19 is a block diagram showing an embodiment implementing a positioning system including an external processing unit for carrying out a positioning calculation process.

Embodiment of Positioning System Measuring Position at Apparatus External to Receiver: FIG. 19

In the embodiment described above, the CPU employed in the GPS receiver implemented by the embodiment shown in FIG. 1 executes processing programs to carry out a positioning calculation process. In an alternative system, the GPS receiver is connected to an external processing apparatus, which is capable of carrying out processing at a high speed, by a radio or wire communication means capable of communicating data at a high speed. In this case, the GPS receiver merely receives signals from satellites, converts the signals into IF data and transmits the IF data to the external processing apparatus. Thus, the GPS receiver does not carry out a positioning calculation process. Instead, the external processing apparatus receives the IF data from the GPS receiver, catches satellites, confirms the phase of each diffusion code, carries out a positioning calculation process by adoption of the methods described above and transmits information on a position obtained as a result of the process to the GPS receiver. The GPS receiver receives the information on a position and displays the information on the display unit.

FIG. 19 is a block diagram showing an embodiment implementing the alternative positioning system described above. A GPS receiver 90 functions as a radio communication terminal such as a hand phone. On the other hand, an external processing apparatus 100 has a radio communication function for communicating with a base station of the hand phone.

In the GPS receiver 90, a signal received by an antenna 11 from a satellite is supplied to a frequency conversion unit 20 for converting the signal into an intermediate-frequency signal, which is further converted into the IF data described above. The IF data is then fed to a control/processing unit 30.

However, the GPS receiver 90 does not carry out the synchronization-catching process and the positioning calculation process. The IF data is supplied as it is to a modulation unit 93 for modulating the IF data. The modulated data is supplied to a transceiver unit 92 for converting the data into a radio-frequency signal, which is then transmitted to the external processing apparatus 100 by way of the antenna 91.

In the external processing apparatus 100, the radio-frequency signal received by an antenna 101 from the GPS receiver 90 is supplied to a transceiver unit 102 for converting the frequency of the signal. The signal with a converted frequency is then fed to a modem unit 103 for demodulating the signal to obtain the IF data described above. The IF data is further supplied to a processing unit 104 in which a synchronization-catching unit employed therein carries out a process of catching the satellite from the IF data and detects the phase of the diffusion code.

In addition, the processing unit 104 carries out a process to measure and calculate a position from the phase of the diffusion code by adoption of any one of the first to third methods described above. In this case, locus information of the satellites is received from the satellites at a location other than the installation location of the external processing apparatus 100. The locus information is stored in a storage unit 105 of the external processing apparatus 100 to be used in the positioning calculation process.

As the approximate position of the receiver, a position obtained as a result of an immediately preceding positioning process and stored in the storage unit 105 is used. As an alternative, the position of the external processing apparatus 100 is used. The position of the external processing apparatus 100 is obtained as a result of a positioning process carried out on signals received from satellites at an installation location of the external processing apparatus 100. In this latter case, the position of the external processing apparatus 100 can be used as the approximate position of the GPS receiver 90 provided that the external processing apparatus 100 is located at a place close to the GPS receiver 90.

In the external processing apparatus 100, the data representing the position information obtained as a result of calculation is supplied to the modem unit 103 for modulating the data. The modulated data is then fed to the transceiver unit 102 for converting the data into a signal having a radio frequency. The signal having a radio frequency is finally transmitted to the GPS receiver 90 by way of the antenna 101.

In the GPS receiver 90, the antenna 91 receives the signal and supplies the signal to the transceiver unit 92 for converting the frequency of the signal. The signal with its frequency converted is supplied to the modem unit 93 for demodulating the signal to obtain position information as a result of calculation. The position information is further supplied to the display unit 17 for displaying the information over a displayed map based on map information read out from a map memory 16. The position information and the map are displayed under control executed by the control/processing unit 30.

It is to be noted that another configuration can be provided. In the other configuration, the GPS receiver 90 may not have the map information. In this case, map information for areas in close proximity to the position of the GPS receiver 90 is received from the external processing apparatus 100 when the position information obtained as a result of calculation is transmitted from the external processing apparatus 100 to the GPS receiver 90. The map information is then displayed on the display unit 17 employed in the GPS receiver 90.

In accordance with the positioning system implemented by this embodiment, the external processing apparatus 100 is capable of calculating coordinates of the GPS receiver 90 by adoption of any one of the first to third embodiments described above without confirming the TOW. Thus, the GPS receiver 90 does not have to transmit IF data, which has a length corresponding to a long period of at least 6 seconds and is required for confirmation of the TOW, to the external processing apparatus 100. Instead, the GPS receiver 90 needs to transmit only IF data, which has a length corresponding to a short period of 1 second and is required for confirmation of the phase of a diffusion code, to the external processing apparatus 100. As a result, the size of a memory employed in the GPS receiver 90 and required for storing IF data can be reduced considerably. In addition, communication means for exchanging data between the GPS receiver 90 and the external processing apparatus 100 is relieved from restrictions such as a band limitation, which are imposed on the communication means.

Other Embodiments

In the case of the embodiments described above, the present invention is applied to a GPS. However, the present invention can also be applied to any positioning systems other than the GPS as long as the other positioning systems use satellites and their diffusion codes.

What is claimed is:

1. A positioning receiver comprising:

phase confirmation means for receiving a signal from each of at least five satellites, locus information of each of which has been received, and confirming the phase of a diffusion code in a condition where said locus information has been obtained from each of said satellites as well as an approximate present time and an approximate position of a receiver is already known; and coordinate calculation means for establishing at least five simultaneous equations for said at least five satellites respectively to represent a relation between the positions of each of said satellites as well as said receiver and a time required by said diffusion code to arrive at said receiver, and solving said at least five simultaneous equations in order to calculate 3-dimensional coordinates of said receiver, wherein:

said at least five simultaneous equations include five unknown quantities, namely, a reference time, an error of a clock for measuring a diffusion-code reception time for each of said satellites and said 3-dimensional coordinates of said receiver;

said diffusion code is transmitted from each of said satellites at a diffusion-code transmission time expressed as a sum of a time having a value represented by digits expressing a number equal to or greater than one unitary time corresponding to one period of said diffusion code and a time having a value represented by digits expressing a number smaller than said unitary time; and said time represented by said digits expressing a number equal to or greater than said unitary time is represented by a sum of said reference time which is common to all said satellites and a differential time which varies from satellite to satellite.

2. A positioning receiver according to claim 1, wherein said coordinate calculation means establishes a distance equation showing that a distance from a coordinate origin to said receiver is a constant and combines said distance equation with four of said simultaneous equations to give five new simultaneous equations for solving said five new simultaneous equations in order to calculate said 3-dimensional coordinates of said receiver.

3. A positioning calculation method for calculating 3-dimensional coordinates of a receiver in a condition where signals are received from at least five satellites, the phase of a diffusion code and locus information have been obtained from each of said satellites, an approximate present time has been obtained and an approximate position of said receiver is already known, wherein:

said positioning calculation method establishes at least five simultaneous equations for said at least five satellites respectively to represent a relation between the positions of each of said satellites as well as said receiver and a time required by said diffusion code to arrive at said receiver, and solves said at least five simultaneous equations in order to calculate 3-dimensional coordinates of said receiver, wherein:

said at least five simultaneous equations include five unknown quantities, namely, a reference time, an error of a clock for measuring a diffusion-code reception time for each of said satellites and said 3-dimensional coordinates of said receiver;

said diffusion code is transmitted from each of said satellites at a diffusion-code transmission time expressed as a sum of a time having a value represented by digits expressing a number equal to or greater than one unitary time corresponding to one period of said diffusion code and a time having a value represented by digits expressing a number smaller than said unitary time; and said time represented by said digits expressing a number equal to or greater than said unitary time is represented by a sum of said reference time which is common to all said satellites and a differential time which varies from satellite to satellite.

4. A positioning calculation method according to claim 3, wherein solutions to said simultaneous equations are calculated by adoption of method of least squares.

5. A positioning calculation method according to claim 3, establishing a distance equation showing that a distance from a coordinate origin to said receiver is a constant and combining said distance equation with four of said simultaneous equations to give five new simultaneous equations for solving said five new simultaneous equations in order to calculate said 3-dimensional coordinates of said receiver.

6. A positioning calculation method comprising:

a first step of receiving a signal from each of at least five satellites, locus information of each of which has been received, and confirming the phase of a diffusion code in a condition where said locus information has been obtained from each of said satellites as well as an approximate present time and an approximate position of a receiver is already known; and a second step of establishing at least five simultaneous equations for said at least five satellites respectively to represent a relation between the positions of each of said satellites as well as said receiver and a time required by said diffusion code to arrive at said receiver, and solving said at least five simultaneous equations in order to calculate 3-dimensional coordinates of said receiver, wherein:

said at least five simultaneous equations include five unknown quantities, namely, a reference time, an error of a clock for measuring a diffusion-code reception time for each of said satellites and said 3-dimensional coordinates of said receiver;

said diffusion code is transmitted from each of said satellites at a diffusion-code transmission time expressed as a sum of a time having a value represented by digits expressing a number equal to or greater than one unitary time corresponding to one period of said diffusion code and a time having a value represented by digits expressing a number smaller than said unitary time; and said time represented by said digits expressing a number equal to or greater than said unitary time is represented by a sum of said reference time which is common to all said satellites and a differential time which varies from satellite to satellite.

7. A positioning calculation method according to claim 6, wherein said second step establishes a distance equation showing that a distance from a coordinate origin to said receiver is a constant and combines said distance equation with four of said simultaneous equations to give five new simultaneous equations for solving said five new simultaneous equations in order to calculate said 3-dimensional coordinates of said receiver.

* * * * *